United States Patent
You et al.

(10) Patent No.: US 9,769,838 B2
(45) Date of Patent: Sep. 19, 2017

(54) METHOD AND USER DEVICE FOR RECEIVING UPLINK CONTROL INFORMATION, AND METHOD AND BASE STATION FOR TRANSMITTING UPLINK CONTROL INFORMATION

(71) Applicant: LG ELECTRONICS INC., Seoul (KR)

(72) Inventors: Hyangsun You, Anyang-si (KR); Yunjung Yi, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/419,452

(22) Filed: Jan. 30, 2017

(65) Prior Publication Data
US 2017/0142738 A1 May 18, 2017

Related U.S. Application Data

(63) Continuation of application No. 14/427,953, filed as application No. PCT/KR2013/011728 on Dec. 17, 2013, now Pat. No. 9,591,631.
(Continued)

(51) Int. Cl.
*H04W 4/00* (2009.01)
*H04W 72/08* (2009.01)
(Continued)

(52) U.S. Cl.
CPC .......... *H04W 72/085* (2013.01); *H04L 5/005* (2013.01); *H04W 72/0406* (2013.01); *H04W 72/0473* (2013.01)

(58) Field of Classification Search
None
See application file for complete search history.

(56) References Cited

U.S. PATENT DOCUMENTS

2006/0291403 A1 12/2006 Kahtava et al.
2009/0196259 A1 8/2009 Pani et al.
(Continued)

FOREIGN PATENT DOCUMENTS

| CN | 101933362 A | 12/2010 |
|---|---|---|
| CN | 102547779 A | 7/2012 |

(Continued)

OTHER PUBLICATIONS

NTT DOCOMO, "Enhanced Cell Identification for Additional Carrier Type," 3GPP TSG RAN WG1 Meeting #68, R1-120398, Dresden, Germany, Feb. 6-10, 2012, pp. 1-4.
(Continued)

*Primary Examiner* — Phirin Sam
(74) *Attorney, Agent, or Firm* — Birch, Stewart, Kolasch & Birch, LLP

(57) ABSTRACT

A method for receiving, by a user equipment, a downlink signal, the method includes receiving, by the user equipment from a serving cell, discovery signal based radio resource measurement information for a cell different from the serving cell; receiving, by the user equipment from the cell, a discovery signal of the cell at discovery signal transmission periodicity based on the discovery signal based radio resource measurement information; and performing, by the user equipment, reference signal received power, RSRP, measurement for the cell based on the discovery signal.

20 Claims, 13 Drawing Sheets

Related U.S. Application Data

(60) Provisional application No. 61/738,392, filed on Dec. 17, 2012.

(51) Int. Cl.
*H04W 72/04* (2009.01)
*H04L 5/00* (2006.01)

(56) References Cited

U.S. PATENT DOCUMENTS

| | | |
|---|---|---|
| 2010/0232534 A1 | 9/2010 | Lee et al. |
| 2011/0103250 A1 | 5/2011 | Li et al. |
| 2011/0110254 A1 | 5/2011 | Ji et al. |
| 2013/0040640 A1 | 2/2013 | Chen et al. |
| 2013/0077507 A1 | 3/2013 | Yu et al. |
| 2013/0079049 A1 | 3/2013 | Yu et al. |
| 2013/0225169 A1 | 8/2013 | Farnsworth et al. |
| 2013/0258876 A1 | 10/2013 | Damji et al. |
| 2013/0273878 A1 | 10/2013 | Heo et al. |
| 2014/0003262 A1 | 1/2014 | He et al. |
| 2014/0056243 A1 | 2/2014 | Pelletier et al. |
| 2014/0094162 A1* | 4/2014 | Heo .................. H04W 52/0258 455/422.1 |
| 2015/0011236 A1 | 1/2015 | Kazmi et al. |
| 2015/0208271 A1 | 7/2015 | Love et al. |
| 2015/0257118 A1 | 9/2015 | Siomina et al. |
| 2015/0312957 A1 | 10/2015 | Pelletier et al. |
| 2015/0323645 A1 | 11/2015 | Siomina et al. |
| 2016/0205580 A1 | 7/2016 | Pragada et al. |

FOREIGN PATENT DOCUMENTS

| | | |
|---|---|---|
| CN | 102694626 A | 9/2012 |
| KR | 10-2008-0018911 A | 2/2008 |
| KR | 10-0910178 B1 | 7/2009 |
| KR | 10-2010-0018777 A | 2/2010 |
| KR | 10-2012-0113700 A | 10/2012 |
| WO | WO 2006/126079 A2 | 11/2006 |

OTHER PUBLICATIONS

Polaris Wireless, "Content for TR 36.809 (Study of the Inclusion of RF Pattern Matching Technologies as a Location Method in the E-UTRAN)," 3GPP TSG-RAN Working Group 4 (Radio) eMeeting#2011, R4e-110006, Jun. 9, 2011, 19 pages.

* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

FIG. 9
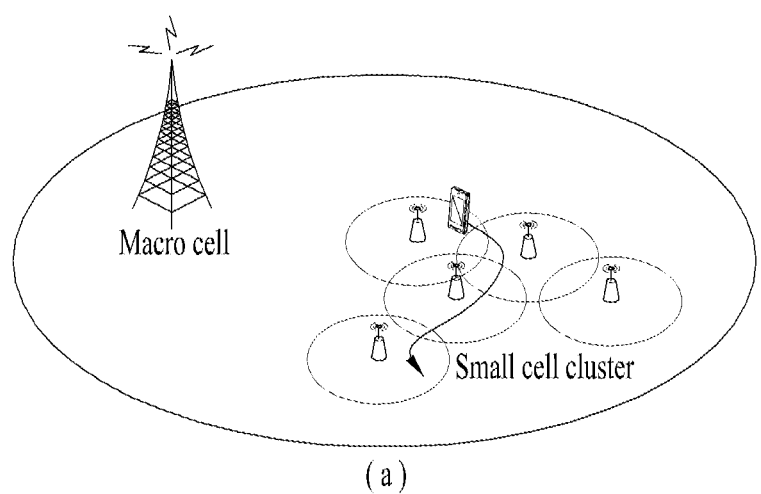
(a)
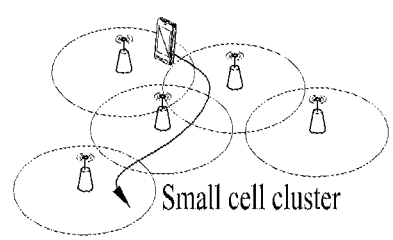
(b)

FIG. 12

| number of CRS ports | one configuration of zero power CSI - RS | PDSCH starting symbol | One non - zero power CSI - RS resource index |

FIG. 13

| Parameter set for cell 1 | Parameter set for cell 2 | Parameter set for cell 3 | Parameter set for cell 4 | Parameter set for cell 5 | Parameter set for cell 6 | Parameter set for cell 7 | Parameter set for cell 8 | Parameter set for cell 9 | Parameter set for cell 10 |

METHOD AND USER DEVICE FOR RECEIVING UPLINK CONTROL INFORMATION, AND METHOD AND BASE STATION FOR TRANSMITTING UPLINK CONTROL INFORMATION

CROSS-REFERENCE TO RELATED APPLICATIONS

This application is a Continuation of co-pending U.S. patent application Ser. No. 14/427,953 filed on Mar. 12, 2015, which is filed as the National Phase of PCT/KR2013/011728 filed on Dec. 17, 2013, which claims the benefit under 35 U.S.C. §119(e) to U.S. Provisional Application No. 61/738,392 filed on Dec. 17, 2012, all of which are hereby expressly incorporated by reference into the present application.

BACKGROUND OF THE INVENTION

Field of the Invention

The present invention relates to a wireless communication system and, more particularly, to a method for transmitting or receiving a uplink or downlink signal and an apparatus therefor.

Discussion of the Related Art

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

SUMMARY OF THE INVENTION

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method for efficiently transmitting/receiving, on limited radio resources, a reference signal, which is used when a control signal and/or a data signal transmitted by a transmitting device is restored by a receiving device is also demanded.

The technical objects that can be achieved through the present invention are not limited to what has been particularly described hereinabove and other technical objects not described herein will be more clearly understood by persons skilled in the art from the following detailed description.

A base station of the present invention informs a user equipment of a first cell set, parameter sets corresponding to cells of the first cell set respectively, and a second cell set which is a subset of the first cell set and associated with the user equipment. The user equipment may receive a downlink signal or transmit an uplink signal using one of the parameter sets related to the second cell set.

The object of the present invention can be achieved by providing a method for receiving a downlink signal in a user equipment, the method including receiving first information on a first cell set including a plurality of cells and a plurality of parameter sets corresponding to the cells respectively, receiving second information indicating a second cell set including at least one of the cells, receiving third information indicating a specific cell in the second cell set, and receiving the downlink signal through the specific cell using a parameter set of the specific cell among the parameter sets based on the third information.

In another aspect of the present invention, provided herein is a user equipment for receiving a downlink signal, the user equipment including a radio frequency (RF) unit and a processor configured to control the RF unit, wherein the processor controls the RF unit to receive first information on a first cell set including a plurality of cells and a plurality of parameter sets corresponding to the cells respectively, second information indicating a second cell set including at least one of the cells, and third information indicating a specific cell in the second cell set, and to receive the downlink signal through the specific cell using a parameter set of the specific cell among the parameter sets based on the third information.

In another aspect of the present invention, provided herein is a method for transmitting a downlink signal in a base station, the method including transmitting first information on a first cell set including a plurality of cells and a plurality of parameter sets corresponding to the cells respectively, transmitting second information indicating a second cell set including at least one of the cells, transmitting third information indicating a specific cell in the second cell set, and transmitting the downlink signal through the specific cell using a parameter set of the specific cell among the parameter sets based on the third information.

In another aspect of the present invention, provided herein is a base station for transmitting a downlink signal, the base station including a radio frequency (RF) unit and a processor configured to control the RF unit, wherein the processor controls the RF unit to transmit first information on a first cell set including a plurality of cells and a plurality of parameter sets corresponding to the cells respectively, second information indicating a second cell set including at least one of the cells, and third information indicating a specific cell in the second cell set, and to transmit the downlink signal through the specific cell using a parameter set of the specific cell among the parameter sets based on the third information.

In each of the aspects of the present invention, each of the parameter sets may include at least the number of antenna ports of a corresponding cell, zero power CSI-RS (channel state information reference signal) resource configuration information of the corresponding cell, information indicating a start symbol of a physical downlink control channel of the corresponding cell or non-zero power CSI-RS resource configuration information of the corresponding cell.

In each of the aspects of the present invention, fourth information indicating switching of a serving cell to another cell different from the specific cell may be further received through the physical downlink control channel of the specific cell.

In each of the aspects of the present invention, another signal may be received or transmitted through the another cell using a parameter set of the another cell among the parameter sets based on the fourth information.

In each of the aspects of the present invention, the another cell may belong to the second cell set.

In each of the aspects of the present invention, decoding of a discovery signal for each cell in the second cell set may be attempted to determine a state of each cell in the second cell set.

The above technical solutions are merely some parts of the embodiments of the present invention and various embodiments into which the technical features of the present invention are incorporated can be derived and understood by persons skilled in the art from the following detailed description of the present invention.

According to embodiments of the present invention, uplink/downlink signals may be efficiently transmitted/received. Accordingly, overall throughput of a wireless communication system is enhanced.

According to embodiments of the present invention, a UE may efficiently perform handover.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 9 illustrates the concept of a small cell.

FIGS. 12 and 13 are diagrams illustrating parameter set(s) according to one embodiment of the present invention.

DETAILED DESCRIPTION OF THE EMBODIMENTS

Figure 1:
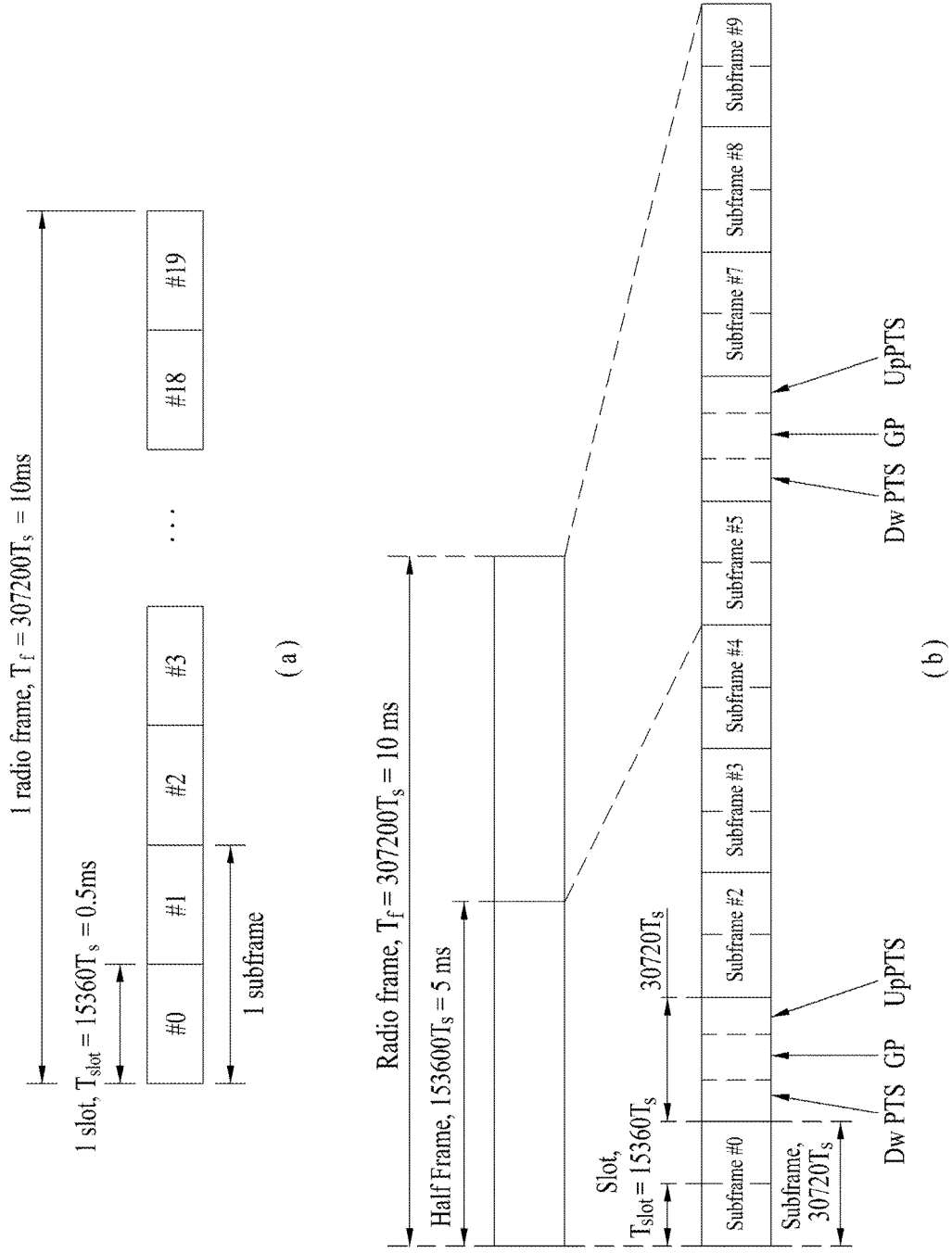
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (CPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both DMRS and UE-RS represent demodulation RSs, and thus the terms DMRS and UE-RS are used to refer to demodulation RSs.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
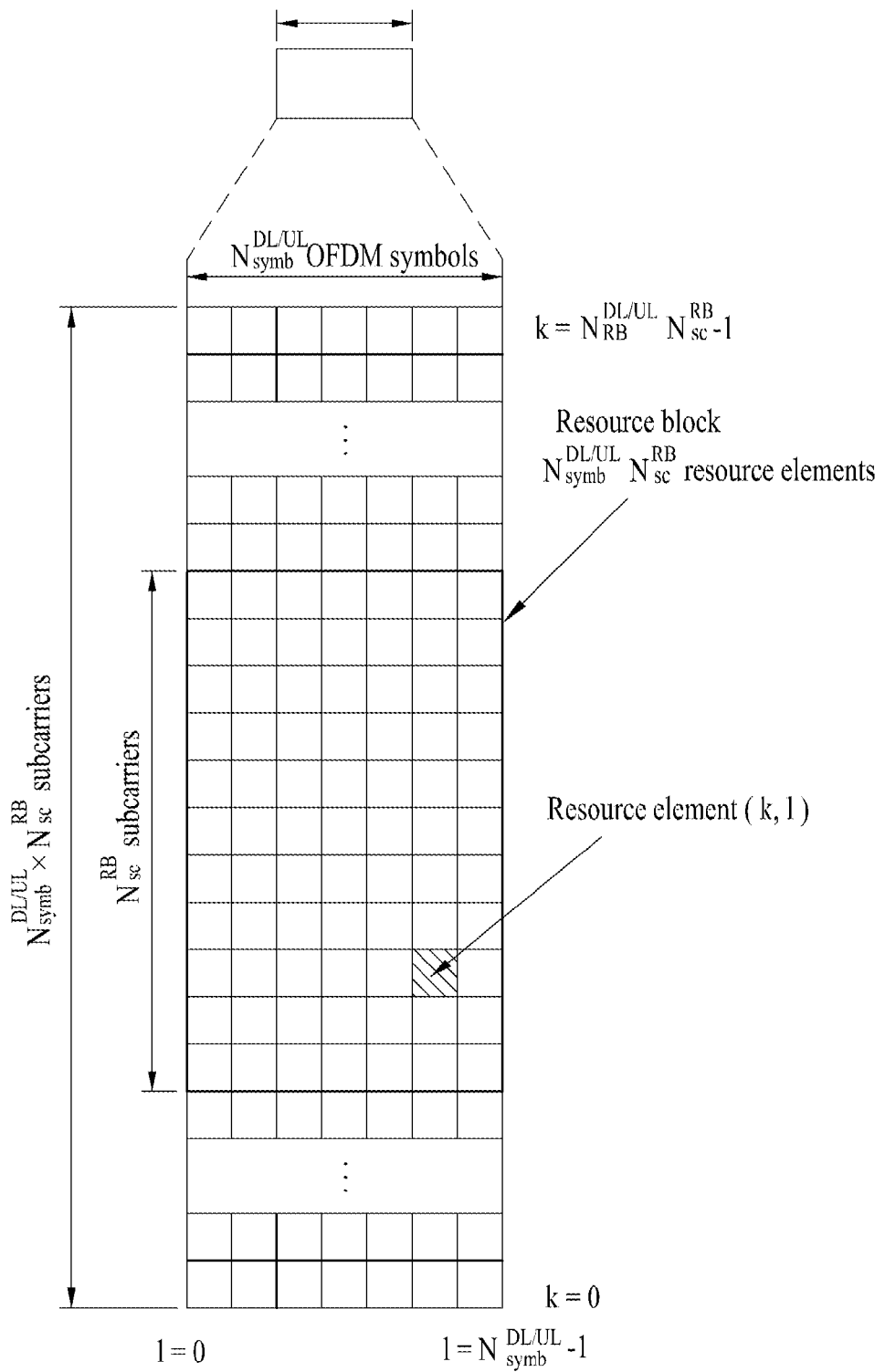
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL/UL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes N $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
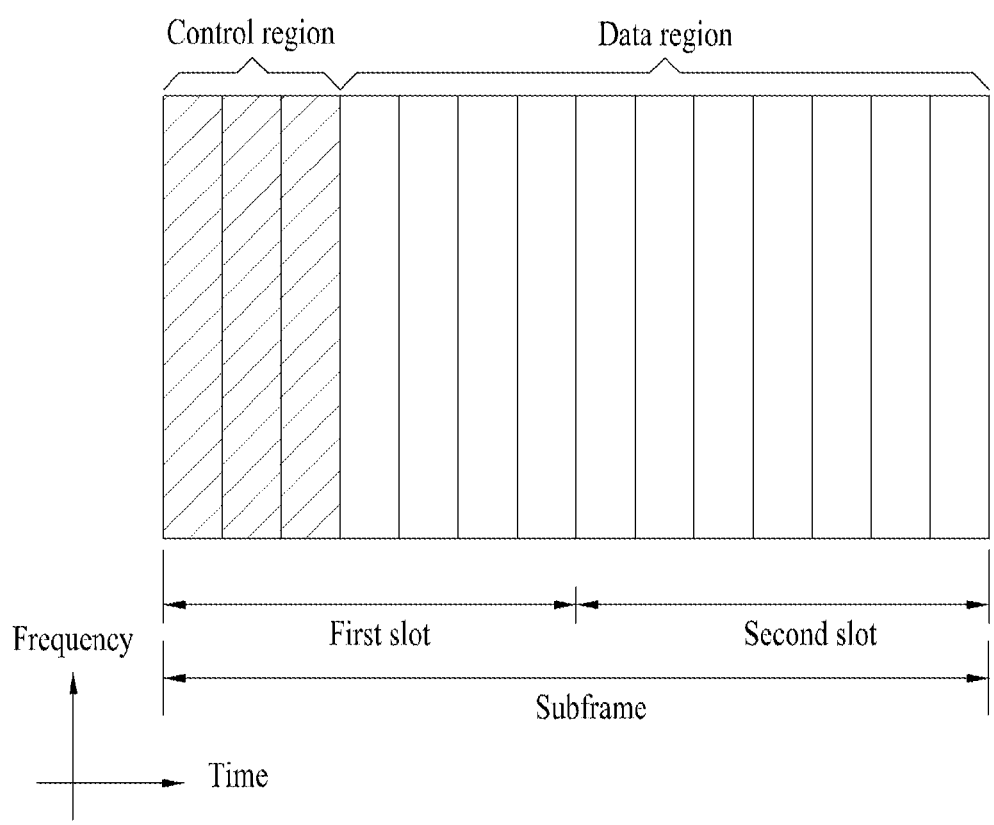
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 3, formats 0 and 4 are DCI formats defined for UL and formats 1, 1A, 1B, 1C, 1D, 2, 2A, 2B, 2C, 3, and 3A are DCI formats defined for DL. Various DCI formats other than the formats shown in Table 3 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=floor(N_{REG}/9)$.

The number of DCI formats and DCI bits is determined in accordance with the number of CCEs. The CCEs are numbered and consecutively used. To simplify the decoding process, a PDCCH having a format including n CCEs may be initiated only on CCEs assigned numbers corresponding to multiples of n. For example, a PDCCH including n consecutive CCEs ma be initiated only on CCEs satisfying 'i mod n=0'. Herein, i denotes a CCE index (or a CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
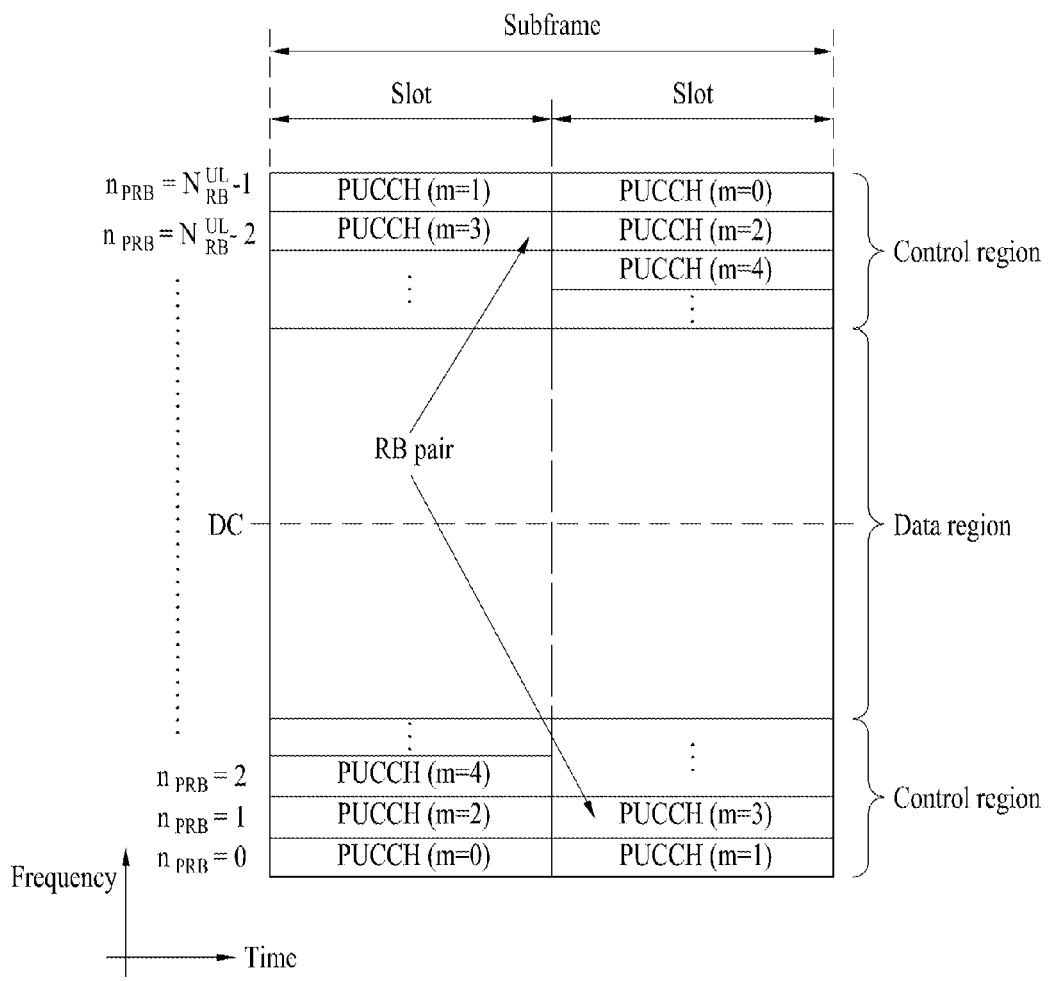
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

- Scheduling request (SR): SR is information used to request a UL-SCH resource and is transmitted using an on-off keying (OOK) scheme.
- HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.
- Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

The present invention may be applied not only to single-carrier communication but also to multi-carrier communication.

Figure 5:
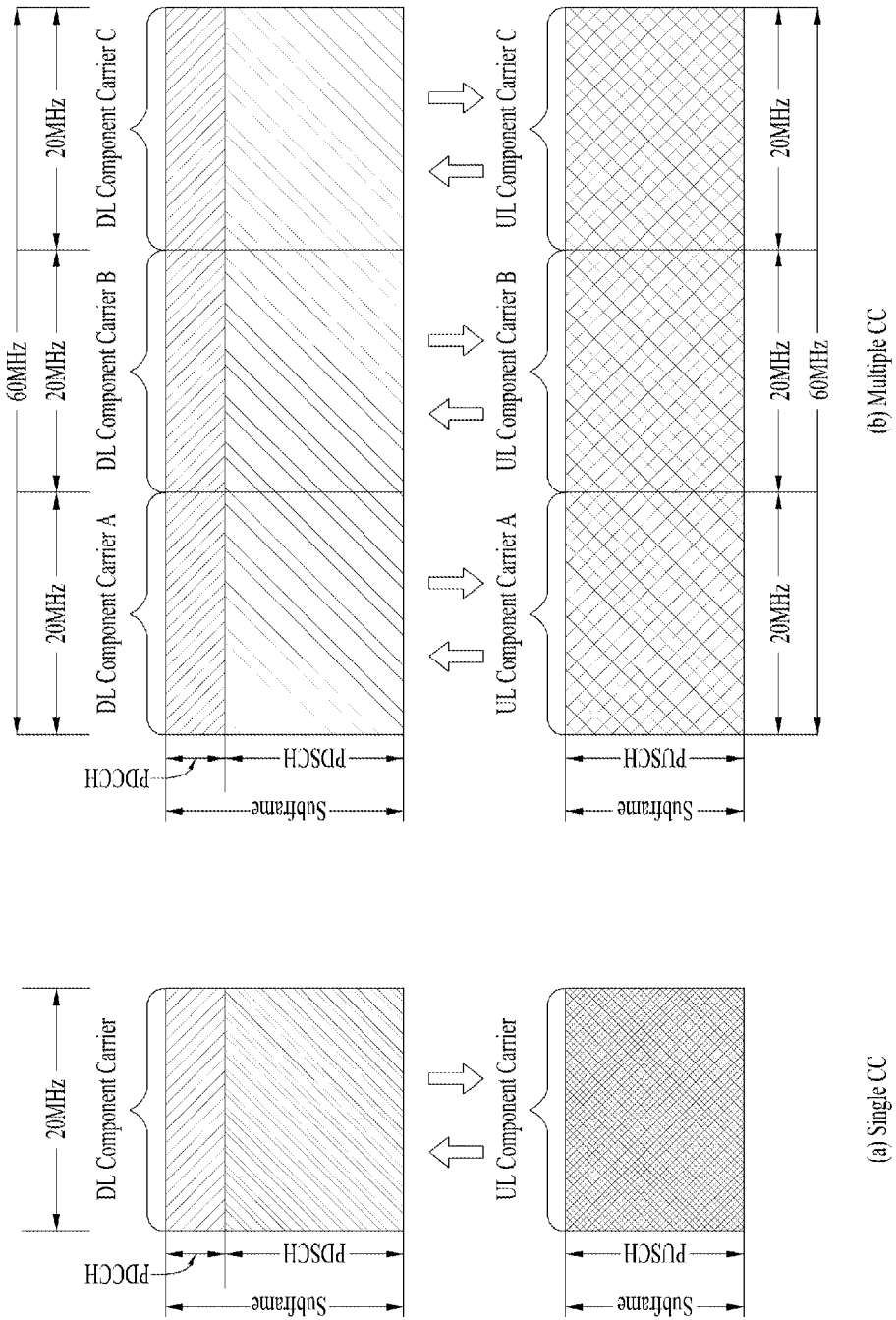
FIG. 5 is a diagram for explaining single-carrier communication and multi-carrier communication.

FIG. 5 is a diagram for explaining single-carrier communication and multi-carrier communication. Specially, FIG. 5(a) illustrates a subframe structure of a single carrier and FIG. 5(b) illustrates a subframe structure of multiple carriers.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Among the cells of an eNB, a cell in which carrier aggregation has been performed for a UE based on the measurement report from another eNB or UE is referred to as configured cell or serving cell. The serving cell is configured for each UE.

The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE, and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes may be used. For example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured.

For reference, in the CA situation, the CIF, which is a field included in the DCI, is used to indicate a cell for which the DCI carries scheduling information. The eNB may inform, through a higher layer signal, the UE of whether or not the DCI which the UE will receive includes the CIF. That is, the CIF may be configured for the UE by a higher layer.

When cross carrier scheduling (also referred to as cross-CC scheduling) is applied, a PDCCH for DL assignment may be transmitted on, for example, DL CC#0 and a PDSCH corresponding to the PDCCH may be transmitted on, for example, DL CC#2. Whether a CIF is present in the PDCCH may be configured semi-statically and UE-specifically (or UE group-specifically) by higher layer signaling (e.g. RRC signaling).

The present invention may be applied not only to the PDCCH, the PUCCH, and the PDSCH and/or PUSCH scheduled by the PDCCH but also to an EPDCCH, a PUSCH, and a PDSCH and/or PUSCH scheduled by the EPDCCH.

Figure 6:
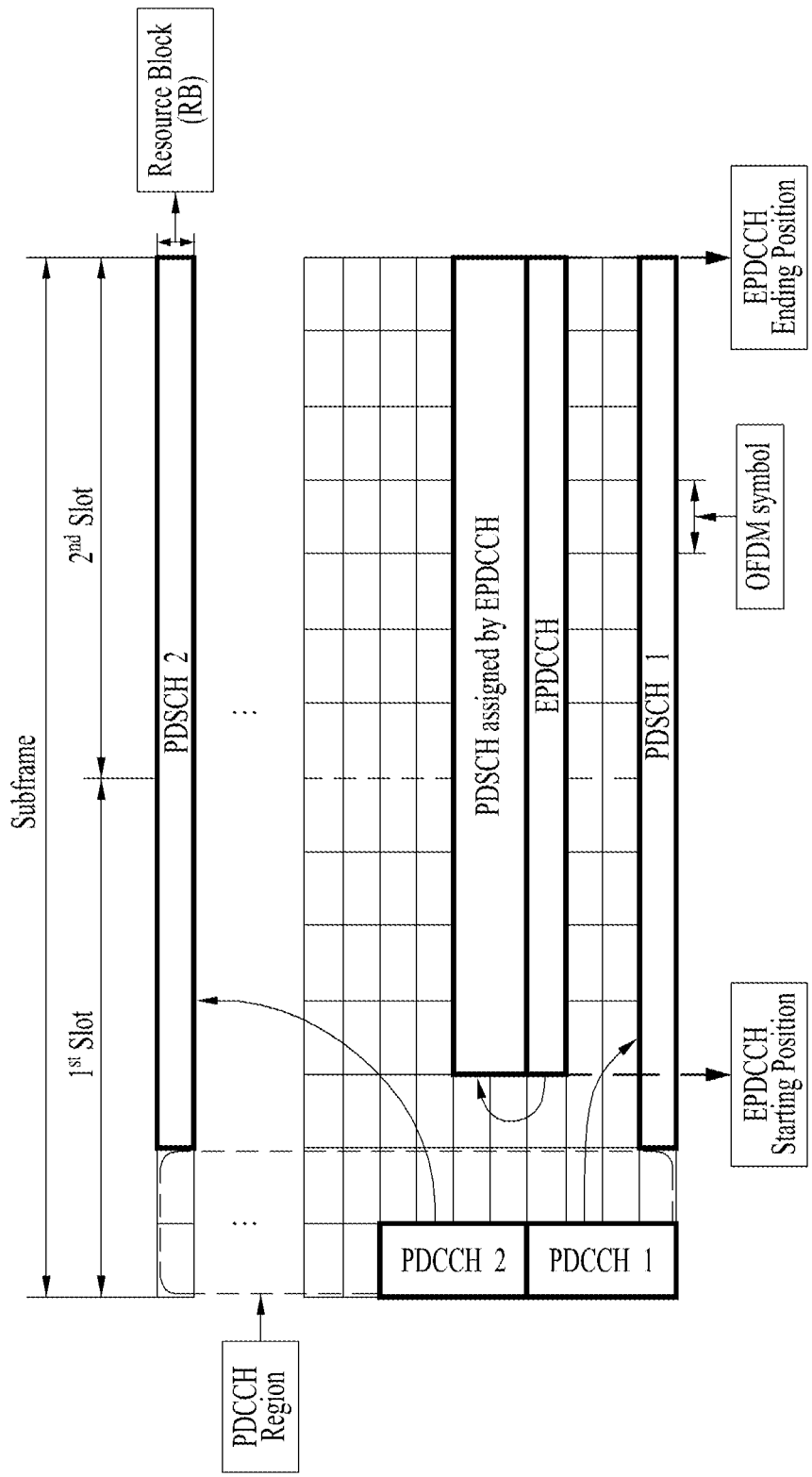
FIG. 6 illustrates a physical downlink control channel (PDCCH) or an enhanced PDCCH (EPDCCH), and a data channel scheduled by PDCCH/EPDCCH.

FIG. 6 illustrates a physical downlink control channel (PDCCH) or an enhanced PDCCH (EPDCCH), and a data channel scheduled by PDCCH/EPDCCH. Particularly, FIG. 6 illustrates the case in which the EPDCCH is configured by spanning the fourth symbol to the last symbol of a subframe. The EPDCCH may be configured using consecutive frequency resources or may be configured using discontinuous frequency resources for frequency diversity.

Referring to FIG. 6, PDCCH 1 and PDCCH 2 may schedule PDSCH 1 and PDSCH 2, respectively, and the EPDCCH may schedule another PDSCH. Similarly to the case of a PDCCH, specific resource assignment units may be defined for the EPDCCH and the EPDCCH may be configured by a combination of the defined specific resource assignment units. When the specific resource assignment units are used, there is an advantage of enabling execution of link adaptation because less resource assignment units can be used to configure the EPDCCH in the case of a good channel state and more resource assignment units can be used to configure the EPDCCH in the case of a poor channel state. Hereinafter, in order to distinguish a basic unit of the EPDCCH from a CCE which is a basic unit of the PDCCH, the basic unit of the EPDCCH will be referred to as an enhanced CCE (ECCE). It is assumed hereinafter that, for an aggregation level L of the EPDCCH, the EPDCCH is transmitted on an aggregation of L ECCEs. Namely, like the aggregation level of the PDCCH, the aggregation level of the EPDCCH also refers to the number of ECCEs used for transmission of one DCI. Hereinafter, an aggregation of ECCEs on which the UE is capable of detecting the EPDCCH thereof will be referred to as an EPDCCH search space. DCI carried by the EPDCCH is mapped to a single layer and precoded.

The ECCEs constituting the EPDCCH may be categorized into a localized ECCE (hereinafter, L-ECCE) and a distributed ECCE (hereinafter, D-ECCE) according to a scheme of mapping the ECCE(s) to RE(s). The L-CCE means that REs constituting an ECCE are extracted from the same PRB pair. If the EPDCCH is configured using L-ECCE(s), beamforming optimized for each UE can be performed. On the other hand, the D-ECCE corresponds to the case in which REs constituting the ECCE are extracted from different PRB pairs. Unlike the L-ECCE, the D-ECCE can acquire frequency diversity in spite of a restriction on beamforming. In localized mapping, a single antenna port p∈{107,108,109,110} used for EPDCCH transmission is a function of index(es) of the ECCE for defining the EPDCCH. In distributed mapping, REs in an EREG are associated with one of two antenna ports in an alternating manner.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, demodulation may be viewed as a part of the decoding process. In the present invention, the terms demodulation and decoding are used interchangeably.

Figure 7:
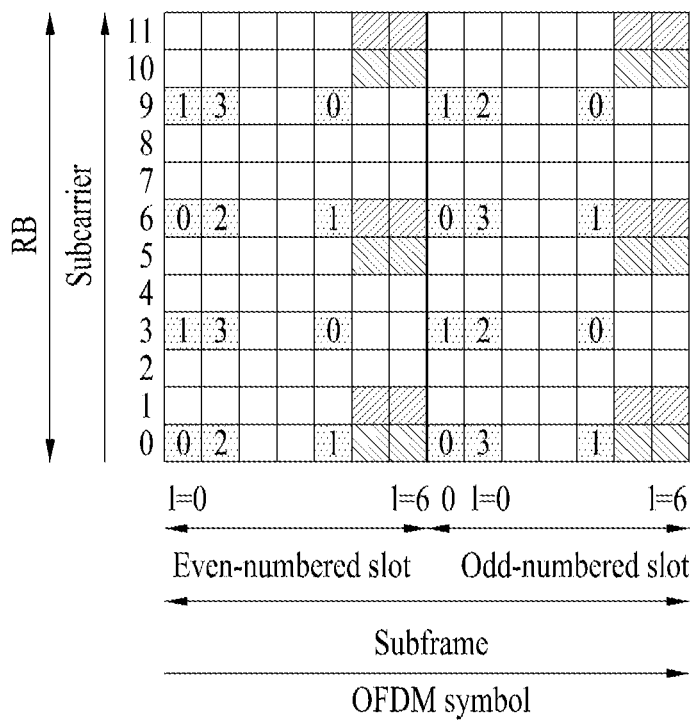
FIG. 7 illustrates configuration of cell specific reference signals (CRSs) and user specific reference signals (UE-RS).

FIG. 7 illustrates configuration of cell specific reference signals (CRSs) and user specific reference signals (UE-RS). In particular, FIG. 7 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

More specifically, CRS sequence $r_{l,n_s}(m)$ is mapped to complex-valued modulation symbols $a_{k,l}^{(p)}$ used as reference symbols for antenna port p in slot $n_s$ according to the following equation.

$$a_{k,l}^{(p)} = r_{l,n_s}(m')$$ [Equation 1]

where $n_s$ is the slot number in a radio frame, and l is the OFDM symbol number within the slot, which is determined according to the following equation.

$$k = 6m + (v + v_{shift}) \mod 6$$ [Equation 2]

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

where k denotes a subcarrier index, l denotes an OFDM symbol index, and $N_{RB}^{max,DL}$ denotes the largest DL bandwidth configuration, expressed as an integer multiple of $N_{sc}^{RB}$.

Parameters v and $v_{shift}$ define locations for different RSs in the frequency domain and v is given as follow.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$ [Equation 3]

The cell-specific frequency shift $v_{shift}$ is given by a physical layer cell identity $N_{ID}^{cell}$ as follows.

$$v_{shift} = N_{ID}^{cell} \mod 6$$ [Equation 4]

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

UE-RSs are transmitted on antenna port(s) p=5, p=7, p=8 or p=7, 8, . . . , u+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7, 8, . . . , u+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m')$$ [Equation 4]

where $w_p(i)$, l', m' are given as follows.

[Equation 5]

$$w_p(i) = \begin{cases} \overline{w}_p(i) & (m' + n_{PRB}) \mod 2 = 0 \\ \overline{w}_p(3 - i) & (m' + n_{PRB}) \mod 2 = 1 \end{cases}$$

$$k = 5m' + N_{sc}^{RB} n_{PRB} + k'$$

-continued $$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where the sequence $\bar{w}_p(i)$ for normal CP is given according to the following equation.

TABLE 4

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, u+6\}$, the UE-RS sequence $r(m)$ is defined as follows.

$$r(m) = \frac{1}{\sqrt{2}}(1 - 2 \cdot c(2m)) + j\frac{1}{\sqrt{2}}(1 - 2 \cdot c(2m+1)),$$  [Equation 7]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

$c(i)$ is a pseudo-random sequence defined by a length-31 Gold sequence. The output sequence $c(n)$ of length $M_{PN}$, where $n = 0, 1, \ldots, M_{PN}-1$, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 8]}$$

where $N_C = 1600$ and the first m-sequence is initialized with $x_1(0) = 1$, $x_1(n) = 0$, $n = 1, 2, \ldots, 30$. The initialization of the second m-sequence is denoted by $c_{init} = \sum_{i=0}^{30} x_2(i) \cdot 2^i$ with the value depending on the application of the sequence.

In Equation 7, the pseudo-random sequence generator for generating $c(i)$ is initialized with $c_{init}$ at the start of each subframe according to the following equation.

$$C_{init} = (\lfloor n_s/2 \rfloor + 1) \cdot (2n_{ID}^{(nSCID)} + 1) \cdot 2^{16} + n_{SCID} \quad \text{[Equation 9]}$$

In Equation 9, $n_{ID}^{(nSCID)}$ indicates a physical layer cell identifier if the value of $n_{ID}^{DMRS,i}$ is not provided by a higher layer or DCI format 1A, 2B or 2C is used for DCI associated with PDSCH transmission. Otherwise, it becomes $n_{ID}^{DMRS,i}$.

In Equation 9, $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Unlike the PDCCH transmitted based on the CRS, the EPDCCH is transmitted based on the demodulation RS (hereinafter, DM-RS). Accordingly, the UE decodes/demodulates the PDCCH based on the CRS and decodes/demodulates the EPDCCH based on the DM-RS. The DM-RS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped.

In case of normal CP, for the antenna port $p \in \{107, 108, 109, 110\}$ in a PRB $n_{PRB}$ assigned for EPDCCH transmission, a part of the DM-RS sequence $r(m)$ can be mapped to complex-modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 10]}$$

where $w_p(i)$, $l'$, $m'$ can be given by the following equation.

[Equation 11]

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{107, 108\} \\ 0 & p \in \{109, 110\} \end{cases}$$

-continued $$l = \begin{cases} l' \bmod 2 + 2 & \text{if in a special subframe with configuration 3, 4, or 8(see Table 2)} \\ l' \bmod 2 + 2 + 3\lfloor l'/2 \rfloor & \text{if in a special subframe with configuration 1, 2, 6, or 7(see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7(see Table 2)} \\ 0, 1 & \text{if } n_s \bmod 2 = 0 \text{ and not in special subframe with configuration 1, 2, 6, or 7(see Table 2)} \\ 2, 3 & \text{if } n_s \bmod 2 = 1 \text{ and not in special subframe with configuration 1, 2, 6, or 7(see Table 2)} \end{cases}$$

$$m' = 0, 1, 2$$

where the sequence $\bar{w}_p(i)$ is given by the following table.

TABLE 5

| Antenna port p | $[\bar{w}_p(0)\ \bar{w}_p(1)\ \bar{w}_p(2)\ \bar{w}_p(3)]$ |
|---|---|
| 107 | [+1 +1 +1 +1] |
| 108 | [+1 −1 +1 −1] |
| 109 | [+1 +1 +1 +1] |
| 110 | [+1 −1 +1 −1] |

For example, in FIG. 7, the REs occupied by the UE-RS(s) of the antenna port 7 or 8 may be occupied by the DM-RS(s) of the antenna port 107 or 108 on the PRB to which the EPDCCH is mapped, and the REs occupied by the UE-RS(s) of antenna port 9 or 10 may be occupied by the DM-RS(s) of the antenna port 109 or 110 on the PRB to which the EPDCCH is mapped. In other words, a certain number of REs are used on each RB pair for transmission of the DM-RS for demodulation of the EPDCCH regardless of the UE or cell if the type of EPDCCH and the number of layers are the same as in the case of the UE-RS for demodulation of the PDSCH. Hereinafter, the PDCCH and the EPDCCH will be simply referred to as PDCCH.

For the antenna port $p \in \{7, 8, \ldots, u+6\}$, the UE-RS sequence r(m) for the EPDCCH is defined by Equation 7. The pseudo-random sequence c(i) of Equation 7 is defined by Equation 8, and the pseudo-random sequence generator for generating c(i) is initialized as $c_{init}$ at the start of each subframe according to the following equation.

$$c_{init} = (\lfloor n_s/2 \rfloor + 1) \cdot (2n_{ID}^{EPDCCH} + 1) \cdot 2^{16} + n_{SCID}^{EPDCCH} \quad \text{[Equation 12]}$$

The EPDCCH DMRS scrambling sequence initialization parameter $n^{EPDCCH}_{SCID}$ is provided by a higher layer signal.

Figure 8:
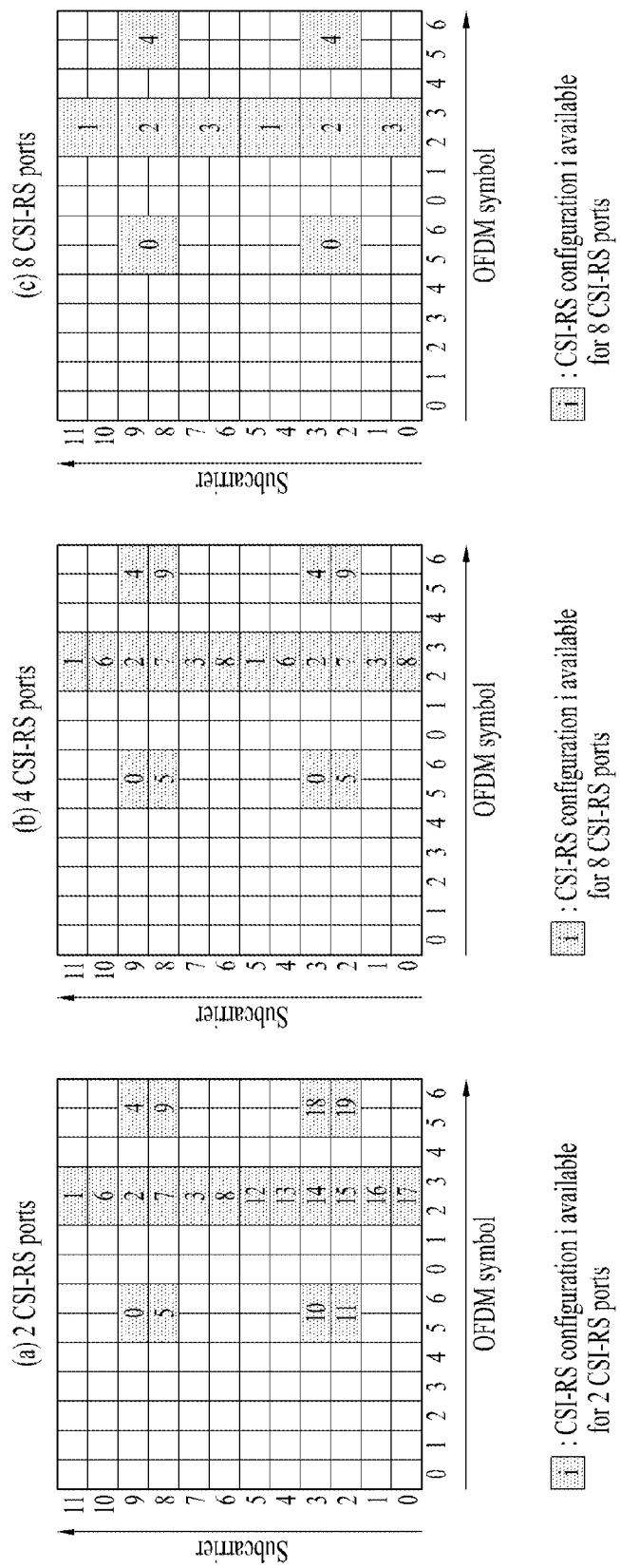
FIG. 8 illustrates channel state information reference signal (CSI-RS) configurations.

FIG. 8 illustrates channel state information reference signal (CSI-RS) configurations.

The CSI-RS is a DL RS introduced in the 3GPP LTE-A system for the purpose of channel measurement, not for the purpose of demodulation. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following equation.

$$a_{k,l}^{(p)} = w_{l''} \cdot r_{l,n_s}(m') \quad \text{[Equation 13]}$$

where $W_{l''}$, k, l are given by the following equation.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{[Equation 14]}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and necessary conditions on $n_s$ are given by Table 6 and Table 7 in a normal CP and an extended CP, respectively. That is, CSI-RS configurations of Table 6 and Table 7 denote locations of REs occupied by a CSI-RS of each antenna port in an RB pair.

TABLE 6

| | CSI reference signal configuration | Number of CSI reference signals configured | | | | | |
|---|---|---|---|---|---|---|---|
| | | 1 or 2 (k', l') | $n_s$ mod2 | 4 (k', l') | $n_s$ mod2 | 8 (k', l') | $n_s$ mod2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 7

| | CSI reference signal configuration | Number of CSI reference signals configured | | | | | |
|---|---|---|---|---|---|---|---|
| | | 1 or 2 (k', l') | $n_s$ mod2 | 4 (k', l') | $n_s$ mod2 | 8 (k', l') | $n_s$ mod2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |

TABLE 7-continued

| | CSI reference signal configuration | Number of CSI reference signals configured | | | | | |
|---|---|---|---|---|---|---|---|
| | | 1 or 2 (k', l') | $n_s$ mod2 | 4 (k', l') | $n_s$ mod2 | 8 (k', l') | $n_s$ mod2 |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

FIG. 8(a) illustrates 20 CSI-RS configurations 0 to 19 available for CSI-RS transmission through two CSI-RS ports among the CSI-RS configurations of Table 6, FIG. 8(b) illustrates 10 available CSI-RS configurations 0 to 9 through four CSI-RS ports among the CSI-RS configurations of Table 6, and FIG. 8(c) illustrates 5 available CSI-RS configurations 0 to 4 through 8 CSI-RS ports among the CSI-RS configurations of Table 6. The CSI-RS ports refer to antenna ports configured for CSI-RS transmission. For example, referring to Equation 14, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured. That is, if subframes for CSI-RS transmission differ even when CSI-RS configuration numbers are the same in Table 6 or Table 7, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number of Table 6 or Table 7 is assigned and a CSI-RS configuration varying according to a CSI-RS configuration number of Table 6 or Table 7, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$ according to $T_{CSI-RS}$ and $\Delta_{CSI-RS}$.

TABLE 8

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Subframes satisfying the following equation are subframes including CSI-RSs.

$$(10n_f + \lfloor n_s/2 \rfloor - \Delta_{CSI-RS}) \mod T_{CSI-RS} = 0 \quad \text{[Equation 15]}$$

A UE configured in the transmission modes defined after introduction of the 3GPP LTE-A system (e.g. transmission mode 9 or other newly defined transmission modes) may perform channel measurement using a CSI-RS and decode a PDSCH using a UE-RS.

In conventional systems subject to communication with one node, the UE-RS, CSI-RS, and CRS are transmitted at the same position, and therefore the UE does not consider a situation in which delay spread, Doppler spread, frequency shift, average received power, and received timing differ among the UE-RS port, CSI-RS port and CRS port. However, for a communication system to which coordinated Multi-Point (CoMP) communication technology allowing more than one node to simultaneously participate in communication with the UE is applied, the properties may differ among the PDCCH port, PDSCH port, UE-RS port, CSI-RS port and/or CRS port. For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the present invention. Alternatively, the definition of QCL may be changed to assume that antenna ports for which QCL assumption is established are co-located. For example, QCL may be defined in a manner that the UE assumes that the antenna ports for which QCL assumption is established are antenna ports of the same transmit point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used in performing channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/ePDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) are QCL, then the UE may apply the estimate(s) of the large-scale properties estimated through a specific RS port to implementation of channel estimation through the DMRS port, thereby improving processing performance of the DMRS-based receiver.

FIG. 9 illustrates the concept of a small cell.

In CA for existing systems, when a plurality of CCs is aggregated and used, data transmission and acquisition of a cell ID, transmission of system information, and transmission of a physical control signal are allowed, and thus there exists a PCC capable of accessing a stand-alone CC and transmitting/receiving a control signal and data. When an SCC which is capable of transmitting/receiving data only when CCs are aggregated with the PCC is configured, it is assumed that UL/DL frame time synchronization with the SCC is consistent with time synchronization of the PCC on the assumption that that CCs not far apart from each other in the frequency domain are aggregated. Further, the existing LTE/LTE-A system considers only a situation in which the aggregated CCs are used by one node, center frequencies neighbors each other, and thus the frequency properties are similar to each other.

However, the CCs configured for the UE may be used by multiple nodes spaced more than a certain distance from each other, and the center frequencies may be spaced apart from each other by an interval greater than a certain level. Accordingly, frequency aggregation of inter-frequencies having different frequency properties may also be considered. When different nodes participate in CA using different CCs or the same CC, namely when different cells participate in CA using the same CC or different CCs, the aggregated CC(s) may be connected by an ideal backhaul or a non-ideal backhaul. The ideal backhaul refers to a backhaul having a very high throughput and a very low delay such as a dedicated point-to-point connection by means of an optical fiber or an LOS (line of sight) microwave. On the other hand, the non-ideal backhaul refers to a typical backhaul such as xDSL (digital subscriber line) and NLOS (non line of sight) microwave which are commercially widely used. With the ideal backhaul, it may be presumed that there is no delay in exchanging information between cells or nodes.

Meanwhile, introduction of a small cell whose size, namely the coverage of the node or CC is smaller than that of the existing cell is under consideration. An existing cell having a wider coverage than the small cell is called a macro cell. The small cell provides services in coverage narrower than the service coverage of the existing cell due to properties thereof including power and frequency. Since the small cell, which uses a node of low power, can be readily disposed at indoor and outdoor hotspots, it is useful when communication traffic soars. Herein, the node of low power generally refers to a node having transmit power lower than the transmit powers of a macro node and a typical eNB. For example, a pico eNB and a femto eNB may be used as low power nodes. When a UE with low mobility requires high throughput, efficiency of data transmission may be increased if the UE uses the small cell.

The small cell may be used as a PCC of a specific UE, or used only as the SCC. Multiple small cells may be established to form a cluster, or multiple small cells and a macro cell may be established together. A small cell cluster formed by a set of multiple small cells may be present within the coverage of the macro cell as shown in FIG. 9(*a*), or may be independently present out of the coverage of the macro cell as shown in FIG. 9(*b*).

The UE positioned within the small cell cluster and receiving a service from a specific small cell may need to change the serving cell from which the UE receives the service to another cell, due to worsened channel conditions of the specific small cell or mobility of the UE.

Figure 10:
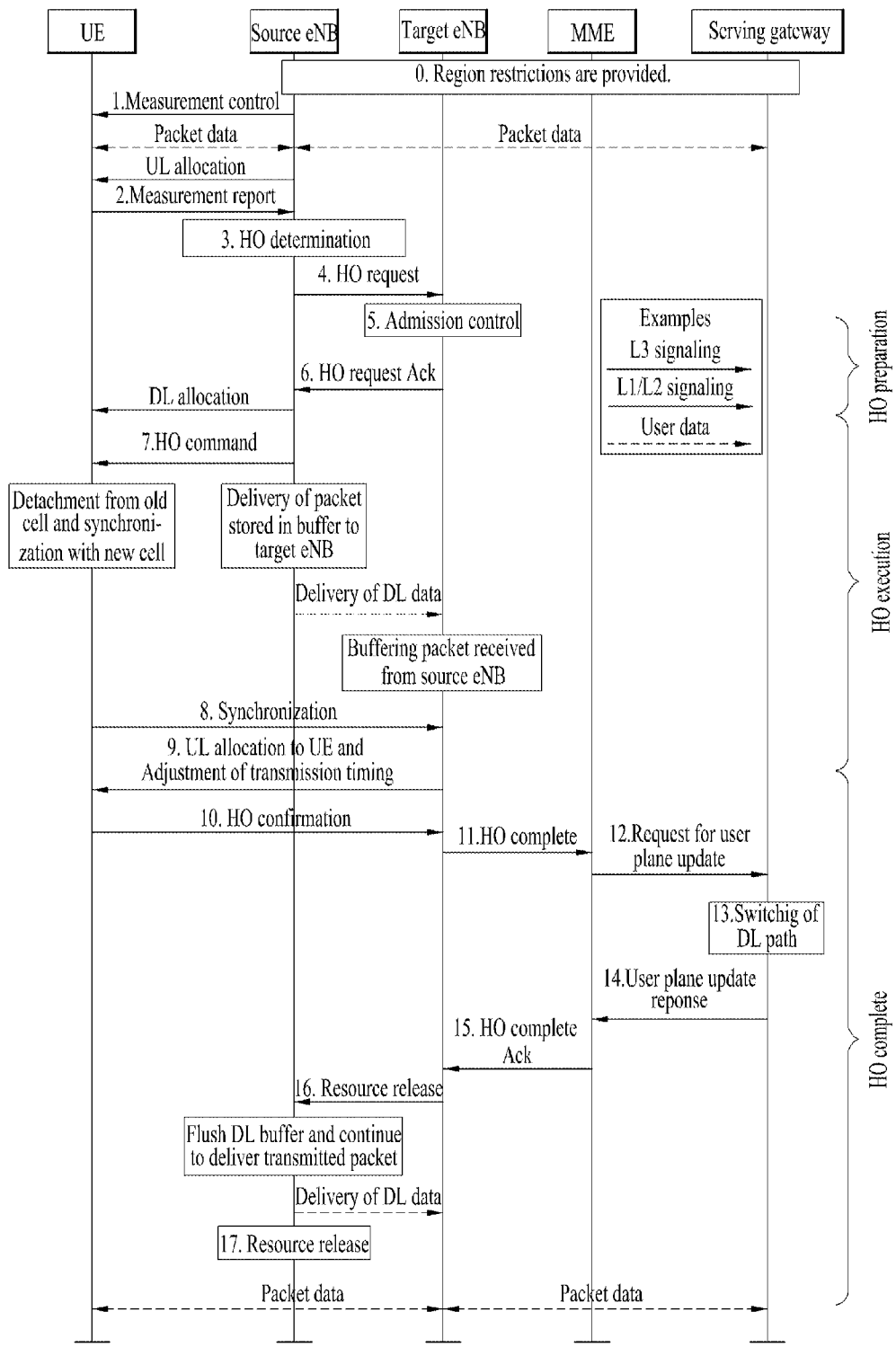
FIG. 10 illustrates the conventional handover process.

FIG. 10 illustrates the conventional handover process. In particular, FIG. 10 illustrates a handover process performed without the mobility management entity (MME) and the serving gateway (GW) changed. For details of the handover process, refer to 3GPP TS (Technical Specification) 36.300 and 3GPP TS 36.331. Hereinafter, an eNB/cell which the UE has accessed to receive a communication service will be referred to as a source eNB/cell, and a new eNB/cell which the UE needs to access will be referred to as a target eNB/cell.

- Step 0: The UE context in the source eNB includes information on roaming restriction given during connection establishment or recent TA update.
- Step 1: The source eNB configures a UE measurement process according to area restriction information. The measurement provided by the source eNB may assist in controlling connection and mobility of the UE.
- Step 2: The UE is triggered to transmit a measurement report according to a rule set by system information and the like.
- Step 3: The source eNB determines whether or not to perform handover of the UE based on the measurement report and radio resource management (RRM) information.
- Step 4: The source eNB transmits information necessary for handover (HO) to the target eNB via a HO request message. The information necessary for HO includes a UE X2 signaling context reference, a UE S1 EPC (Evolved Packet Core) signaling context reference, a target cell ID, and an RRC context containing an identifier (e.g., a cell radio network temporary identifier (C-RNTI)) of the UE within the source eNB.
- Step 6: The target eNB prepares HO with L1/L2R and transmits a handover request Ack (ACKNOWLEDGE) message to the source eNB. The handover request Ack message includes a transparent container transmitted to the UE as an RRC message for performing handover. The container includes a new C-RNTI and security algorithm identifiers of the target eNB for selected security algorithms. The container may include a dedicated RACH (random access channel) preamble and further include additional parameters such as access parameters and SIBs.
- Step 7: The UE receives an RRCConnectionReconfiguration message containing necessary parameters. The UE is instructed by the source eNB to perform handover. The necessary parameters may include a new C-RNTI, and target eNB security algorithm identifiers. The parameters may also include a dedicated RACH preamble and target eNB SIBs, which are optional.
- Step 8: The source eNB sends a serial number (SN) STATUS TRANSFER message to the target eNB to deliver UL PDCP (Protocol Data Convergence Protocol) SN receiver status and DL PDCP SN transmitter status.
- Step 9: After receiving an RRCConnectionReconfiguration message containing MobilityControlInformation, the UE performs synchronization with the target eNB and accesses the target cell over the RACH. If the dedicated RACH preamble is indicated in the MobilityControlInformation, access to the target cell over the RACH is performed in a contention-free process. Otherwise, the access is performed in a contention-based process. The UE derives target eNB-specific keys and configures selected security algorithms to be used in a target cell.
- Step 10: The network performs uplink allocation and timing advance.
- Step 11: If the UE successfully accesses the target cell, the UE confirms handover by transmitting an RRCConnectionReconfigurationComplete message (C-RNTI) and informs the target eNB of completion of the handover process by transmitting an UL buffer status report. The target eNB identifies the received C-RNTI through a handover confirm message and starts to perform data transmission to the UE.
- Step 12: The target eNB sends a path switch message to the MME to signal that the UE has switched the cell to another cell.
- Step 13: The MME sends a User Plane Update Request message to the serving GW.
- Step 14: The serving GW switches the DL data path to the target side. The serving GW may send one or more "end marker" packets to the source eNB on the old path, and then release a user-plane/TNL (Transport Network Layer) resource towards the source eNB.
- Step 15: The serving GW sends a User Plane Update Response message to the MME.
- Step 16: The MME responds to the path switch message using a path switch Ack message.
- Step 17: The target eNB sends a UE Context Release message to inform the source eNB that handover is successful and to trigger resource release.
- Step 18: Upon receiving the UE Context Release message, the source eNB releases user plane-related resources associated with the radio resource and the UE context.

As can be seen from FIG. 10, various information/parameters are exchanged between network entities in the handover process. When the UE performs handover to another small cell or switches between the SCCs in a small cell cluster, handover may frequently occur since the coverage of a small cell is small. Frequent handover may apply large overhead to the UE and the eNB. The present invention proposes a method for the UE to switch the serving cell thereof more quickly and efficiently in order to reduce system overhead caused by frequent handover. For example, a UE which is using a specific small cell in a small cell cluster as a serving cell may need to switch the serving cell to another small cell in the same cluster. According to an embodiment of the present invention, the UE may switch the serving cell more quickly and efficiently than when the conventional handover technique is used. When the Pcell of the UE is switched to another cell in the small cell cluster, the process of initial synchronization may not be performed and the process in which handover is performed may differ from the current process. In addition, radio resource measurement (RRM) different from the current measurement may be performed for the small cell in the same small cell cluster.

For reference, the RRM is intended to enable the UE and the network to seamlessly manage mobility without significant user intervention by providing the UE with mobility experience, to ensure efficient use of the radio resources, and to provide a mechanism making the eNB satisfy predefined radio resource-related requirements. Main processes performed by the UE to support seamless mobility include cell search, measurement, handover and cell reselection. The eNB may provide measurement configurations applicable to the UE to implement RRM. For example, the eNB may trigger measurement by the UE by transmitting, to the UE, measurement configurations including measurement objects, a reporting configuration, a measurement identity, a quantity configuration, and a measurement gap to ensure RRM. The measurement objects, which are objects on which the UE needs to perform measurement, may include, for example, a single E-UTRA carrier frequency for intra-frequency and inter-frequency measurement, a single UTRA frequency for inter-RAT (Radio Access Technology) UTRA measurement, a set of GERAN carrier frequencies for inter-RAT GERAN measurement, and a set of cell(s) on a single carrier frequency for inter-RAT CDMA2000 measurement. The intra-frequency measurement refers to measurement on the DL carrier frequency(s) of the serving cell(s), the inter-frequency measurement refers to measurement on frequency(s) other than one of the DL carrier frequency(s) of the serving cell(s). The reporting configuration refers to a list of reporting configurations. Each reporting configuration is established with a reporting criterion representing a criterion for triggering the UE to send a measurement report and a reporting format indicating the quantities that the UE needs to include in the measurement report and relevant information. The measurement identity is a list of measurement identities. Each measurement identity links one measurement object to one reporting configuration. By configuring a plurality of measurement identifiers, one or more reporting configurations may be linked to the same measurement object, and one or more measurement objects may be linked to the same reporting configuration. The measurement identities are used as reference numbers in a measurement report. The quantity configuration defines measurement quantities and relevant filtering which are used for all event evaluations and relevant reporting of the type of a corresponding measurement. One filter may be configured for each measurement. The measurement gap indicates a period which the UE can utilize to perform measurement as no UL/DL transmission is scheduled. Once the UE receives the measurement configurations, the UE performs reference signal received power (RSRP) measurement and reference signal received quality (RSRQ) measurement using a CRS on a carrier frequency indicated as a measurement object. The RSRP measurement provides a cell-specific signal strength metric. RSRP measurement is generally used to determine an order of candidate cells (or candidate CCs) according to the signal strength, or is used as an input for determining handover and cell reselection. An RSRP is a linear average of power contribution of REs carrying CRS within a considered frequency bandwidth and defined for a specific cell (or specific CC). Similar to RSRP, RSRQ, which is intended to provide a cell-specific signal quality metric, is mainly used to determine an order of candidate cells (or candidate CCs) according to signal quality. The RSRQ may be used as an input for handover and cell reselection when, for example, the RSRP measurement does not provide sufficient information for performing reliable mobility determination. The RSRQ is defined as "N*RSRP/RSSI", wherein N denotes the number of RBs of the RSSI measurement bandwidth. The received signal strength indicator (RSSI) is defined as all kinds of power including a total received wideband power from all resources including co-channel serving and non-serving cells observed by the UE, adjacent channel interference and thermal noise. Accordingly, the RSRQ may be viewed as indicating a ratio of the pure RS power to the total power received by the UE.

Embodiment A. Serving Cell Switching Operation within a Small Cell Cluster

The UE may perform handover of switching the serving cell of the UE between small cells present in the small cell cluster. The UE may be in the RRC_connected state or in the RRC_Idle state depending on whether the RRC of the UE is logically connected with the RRC of the E-UTRAN. When a user turns on the UE for the first time, the UE searches for a proper cell first, and then stays in the RRC_Idle state in the cell. The E-UTRAN cannot check the UE staying in the RRC_Idle state in units of cell, but a core network (CN) manages the UE in units of a tracking area (TA) which is larger than the cell. The UE in the RRC_Idle state may broadcast system information and paging information while performing discontinuous reception (DRX) configured by a non-access stratum (NAS), and may be assigned an identifier for uniquely identifying the UE in a TA. In addition, the UE in the RRC_Idle state may perform selection and reselection of a public land mobile network (PLMN).

All or some of the small cells in the small cell cluster may be RRC_Connected cells which are RRC-connected with the UE. Alternatively, all or some of the small cells may not be RRC_Connected cells, but may be cells to which the UE can switch the serving cell without assistance from a core. In this embodiment, a small cell which can be a target cell of handover and the current serving cell may be subject to the same access barring and PLMN. In addition, if a closed subscriber group (CSG) is applied, it may be assumed that processes necessary for handover have been pre-performed. The CSG is a set of UEs having a connectivity access to a cell. Each CSG has a unique identification number, which is called CSG identity (CSG ID). The UE may have a list of CSGs to which the UE belongs, and this CSG list may be changed according to a request from the UE or a command from the network. The eNB may deliver the CSG ID of a CSG which the eNB supports over system information to allow member UEs of the CSG to access a corresponding cell. When the UE finds a CSG cell, it may identify a CSG which the CSG cell supports by reading the CSG ID included in the system information. Once the CSG ID is read, the UE regards the CSG cell as a cell which the UE can access only if the UE is a member of the cell. On the other hand, the cell may be configured in an open access mode allowing any UE to access the cell. If the CSG is applied to a small cell of the present invention, namely, when the small cell operates in the CSG mode, it may be assumed that information/processes necessary for handover have been pre-shared/pre-performed by the small cell and the UE since the small cell and the UE are already aware of the information of the counterpart. Accordingly, when a cell operates in the CSG mode, the UE may switch the serving cell of the UE according to a process of the present invention, not the existing handover process. The present invention proposes methods which are needed to allow the UE to readily switch the serving cell between the small cells present in the small cell cluster.

Alternative 1

The present invention proposes two cell sets called a small cell set A and a small cell set B. For example, the small cell set A may include all or some of the cells in the small cell cluster, and the small cell set B may include all or some of the cells in the small cell set A. In other words, In other words, the small cell set A may be a subset of the small cell cluster, and the small cell set B may be a subset of the small cell set A. The cells of the small cell cluster or the small cell set A may be cells neighboring each other by being connected by, for example, a backhaul. The cells of the small cell set B may be cells of the small cell set A which are very probable to become target cells of handover or new Scells since they are more adjacent to the UE than the other cells of the small cell set A or have a good channel condition for the UE. This is simply an example. Since the small cell cluster, small cell set A and/or small cell set B are configured by the network, and configuration of the small cell cluster, small cell set A and/or small cell set B depends on implementation of the network, details of the configuration method may change depending on how the network is implemented. The present invention proposes a method of signal transmission/reception between a UE and an eNB on an assumption that the eNB, CN and/or MME can properly configure the small cell cluster, small cell set A and/or small cell set B.

A serving cell of the UE may be selected from among the cells belonging to the small cell set B. If a target serving cell is not included in the small cell set A or the small cell set B, the UE may access the target serving cell through an access process.

The following relationship may be established among the small cell set A, small cell set B, and the UE. If the UE uses cell 1 which is a cell belonging to the small cell set A as a serving cell of the UE, an eNB operating/controlling cell 1, an eNB operating/controlling the serving cell that was used before the UE performed handover to cell 1, or an eNB operating/controlling the Pcell (or the macro cell) of the UE may provide the UE with parameter sets for all cells included in the small cell set A through an RRC signal. When content of the parameter sets for the respective cells is updated, the eNB operating/controlling cell 1 which is the current serving cell of the UE or the eNB operating/controlling the Pcell (or the macro cell) of the UE may inform the UE of the updated parameter sets through a higher layer signal.

Some examples of the parameter set necessary for the present invention are given below.

Master information block (MIB)-related parameters
Downlink bandwidth
PHICH configuration
System frame number (SFN): the SFNs of cells may be aligned in the small cell cluster. In other words, for the cells in the small cell cluster, the subframes at the same start time may have the same SFN. In this case, the SFN may be omitted.

SIB1-related parameters
PLMN identities of the network: it may be assumed that the same PLMN is given in the small cell cluster. In this case, the PLMN information may be omitted.
Tracking area code (TAC) and cell ID
Cell barring status
q-RxLevMin indicating a minimum Rx level in a cell for fulfilling the cell selection criteria
Transmission times and periodicities of other SIBs
PRACH configuration
Cell ON/OFF related information
ON/OFF state period/duration
Cell ID used in the OFF state If the cells in the small cell set A have the same bandwidth and operating frequency, the parameter set for each cell included in the small cell set A may include parameters related to information on PDSCH mapping for CoMP and information on an indicator of quasi-co-location (QCL) between DMRS and CSI-RS. These parameters may include, for example, the following parameters.

Number of CRS ports
Frequency shift of CRS $v_{shift}$
MBSFN (Multimedia Broadcast multicast service Single Frequency Network) subframe configuration list
Configuration of zero power CSI-RS
PDSCH start symbol
Non-zero power CSI-RS resource index The number of CRS ports may represent the number of CRS port(s) which are associated with PDSCH transmission or QCL with PDSCH antenna port(s), the frequency shift of CRS may represent the frequency shift $v_{shift}$ of CRS port(s) which are QCL with PDSCH antenna port(s). The MBSFN subframe configuration list may indicate subframes reserved for the MBSFN on downlink, and the configuration of zero power CSI-RS may indicate a zero power CSI-RS configuration list and a configuration of a zero power CSI-RS subframe. The PDSCH start symbol may indicate the start OFDM symbol of a PDSCH with respect to a corresponding serving cell, and the non-zero power CSI-RS resource index may indicate a CSI-RS resource which is QCL with the PDSCH antenna port(s). The parameters described above may be configured to determine PDSCH RE mapping and PDSCH antenna port QCL.

The small cell set B may be a subset of the small cell set A. If the serving cell of the UE is cell 1 which is a cell belonging to the small cell set A, an eNB operating/controlling cell 1, an eNB operating/controlling the serving cell that was used before the UE performed handover to cell 1, or an eNB operating/controlling the Pcell (or the macro cell) of the UE may inform the UE of the cells belonging to the small cell set B through an RRC signal or a medium access control (MAC) control element (CE).

The cells included in the small cell set B may be used as cells to which the serving cell of the UE can be switched by an RRC configuration, a MAC CE, or a request over a PDCCH which are different from those of the conventional handover technique. In the present invention, cell 1 which is the current serving cell of the UE belonging to the small cell set A also belongs to the small cell set B. The next serving cell for the UE to use may be selected from among the cells included in the small cell set B. If a new small cell set B is configured for the UE, the current serving cell of the UE should belong to the new small cell set B. In addition, if a new small cell set B is configured for the UE, a cell configuring the new small cell set B should be included in the new small cell set B. In the present invention, the small cell set B may be configured as one cell. In this case, the cell belonging to the small cell set B may be the current serving cell of the UE.

To designate one of the cells in the small cell set B as a new serving cell of the UE, an eNB operating/controlling the current serving cell of the UE or an eNB operating/controlling the Pcell (or the macro cell) of the UE may switch the serving cell of the UE through a new RRC reconfiguration process different from the existing handover process. In this case, the serving cell of the UE may be more quickly switched since the cells included in the small cell set B are in the RRC_Connected state or there is no intervention of the core/MME. Alternatively, the eNB operating/controlling the current serving cell of the UE or the eNB operating/controlling the Pcell (or the macro cell) of the UE may switch the serving cell of the UE by transmitting, to the UE, a MAC CE which is set to deactivate the current serving cell among the cells of the small cell set B and to activate another cell of the small cell set B. Alternatively, the eNB operating/controlling the current serving cell of the UE or the eNB operating/controlling the Pcell (or the macro cell) of the UE may switch the serving cell of the UE through a PDCCH/ePDCCH. In this case, information on whether or not the serving cell of the UE is switched to another cell and/or information on a new serving cell such as an index may be included in the PDCCH/ePDCCH. The index of a cell to which the serving cell is to be switched, namely the target cell may be sent to the UE by reusing an existing field (e.g., the TPC field) of the DCI or by adding a new field to the DCI.

Once the UE receives the information such as the index of the new serving cell, the UE may operate, recognizing the corresponding cell as the serving cell thereof, until it receives a next request for switching of the serving cell. In addition, the UE may receive a DL signal and transmit a UL signal, using the parameter set for the new serving cell. In terms of PDSCH reception, if the UE receives information such as the index of the new serving cell, the UE may receive a PDSCH using the parameter set for the new serving cell. For example, if the UE receives information such as the index of the new serving cell through a PDCCH, the UE may receive a PDSCH using the parameter set for the new serving cell from the subframe in which the UE has received the PDCCH (until the UE receives another serving cell switch request). Alternatively, if the UE receives information such as the index of the serving cell of the UE through every PDCCH, the UE may receive the PDSCH of the subframe in which the PDCCH has been received, using the parameter set of the serving cell indicated by the PDCCH.

Figure 11:
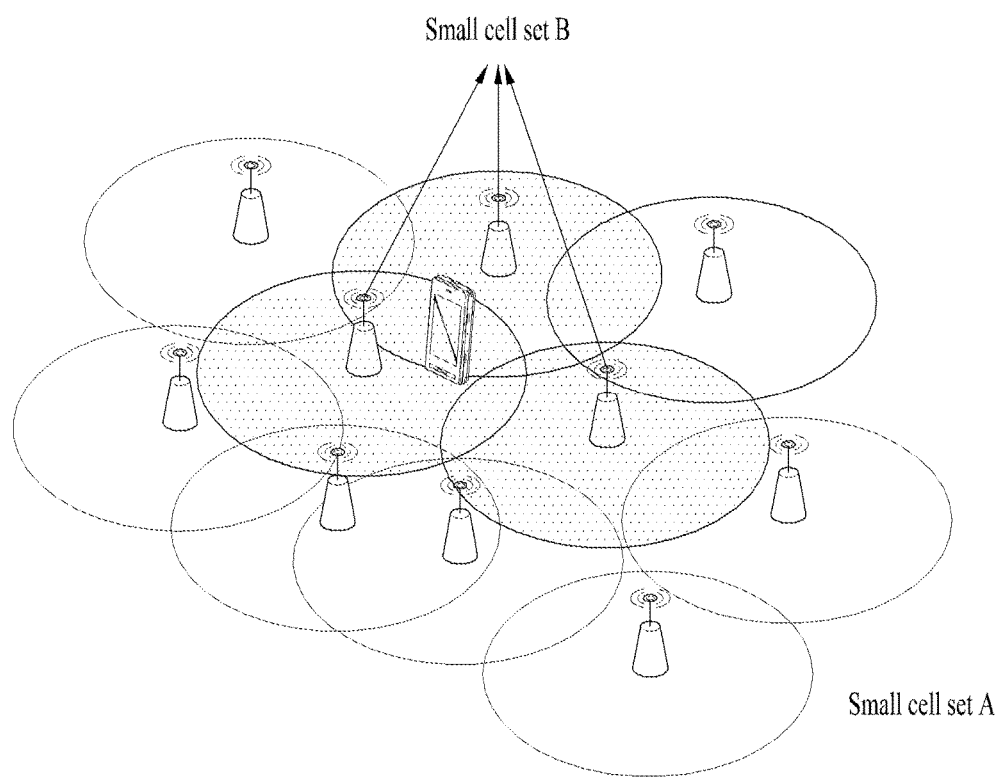
FIG. 11 is a diagram illustrating cell sets according to one embodiment of the present invention.

FIG. 11 is a diagram illustrating cell sets according to one embodiment of the present invention, and FIGS. 12 and 13 are diagrams illustrating parameter set(s) according to one embodiment of the present invention.

As shown in FIG. 11, a small cell set A may exist and some of the cells of the small cell set A may belong to a small cell set B. In this case, the serving cell of the UE may be one of the cells belonging to the small cell set B. For example, if the cells in the small cell set A have the same bandwidth operating frequency, the parameter set for each cell may include parameters as shown in FIG. 12.

If there are 10 small cells in the small cell set A, the eNB may inform the UE of the parameter set for each of the 10 cells. Table 9 exemplarily shows RRC information for configuring the small cell set A, Tables 10 and 11 exemplarily show RRC information on a parameter set corresponding to the small cell set A and corresponding field descriptions.

TABLE 9

SmallCellSetA information element

```
-- ASN1START
...
SmallCellSetA-InfoList ::=   SEQUENCE (SIZE (1..maxSmallCell)) OF
                                SmallCellInfo
SmallCellInfo:: =            SEQUENCE {
    SmallCellIndex               SmallCellIndex,
    cellIdentification           SEQUENCE {
        physCellId                   PhysCellId,
        dl-CarrierFreq               ARFCN-ValueEUTRA
    }
...
}
-- ASN1STOP
```

TABLE 10

SmallCellSetParameter information element

```
-- ASN1START
SmallCellParameter ::=    SEQUENCE {
    SmallCellIndex            SmallCellIndex
    crs-PortsCount            ENUMERATED {n1, n2, n4,
spare1},
    crs-FreqShift             INTEGER (0...5),
        mbsfn-SubframeConfig-r11   MBSFN-SubframeConfig
        OPTIONAL, -- Need OR
    pdsch-Start               ENUMERATED {reserved, n1,
                                 n2, n3, n4,
assigned}
    }
                              OPTIONAL, -- Need OP
    csi-RS-ConfigZPId         CSI-RS-ConfigZPId,
    qcl-CSI-RS-ConfigNZPId    CSI-RS-ConfigNZPId
        OPTIONAL, -- Need OR
    ...
}
    ...
}
-- ASN1STOP
```

TABLE 11

SmallCellSetParameter field descriptions
antennaPortsCount
Parameter represents the number of cell specific antenna ports where an1 corresponds to 1, an2 to 2 antenna ports etc.
MBSFN-SubframeConfig
defines subframes that are reserved for MBSFN in downlink
pdsch-Start
The starting OFDM symbol of PDSCH for the concerned serving cell, see 3GPP TS 36.213.
Values 1, 2, 3 are applicable when dl-Bandwidth for the concerned serving cell is greater than 10 resource blocks, values 2, 3, 4 are applicable when dl-Bandwidth for the concerned serving cell is less than or equal to 10 resource blocks, see 3GPP TS 36.211. Value n1 corresponds to 1, value n2 corresponds to 2 and so on.
csi-RS-ConfigZPId
identifies a CSI-RS resource configuration for which UE assumes zero transmission power, as configured by the IE CSI-RS-ConfigZP. The identity is unique within the scope of a carrier frequency.
qcl-CSI-RS-ConfigNZPId
Indicates the CSI-RS resource that is quasi co-located with the PDSCH antenna ports, see 3GPP TS 36.213. E-UTRAN configures this field if and only if the UE is configured with qcl-Operation set to typeB.

The eNB may further inform the UE of which cells of the 10 cells in the small cell set A belong to the small cell set B. The eNB may notify the UE of the cell belonging to the small cell set B using, for example, a bitmap. For example, if 10 cells from cell 1 to cell 10 belong to the small cell set A, and cell 2, cell 3 and cell 5 belong to the small cell set B, the eNB may inform the UE of the small cell set B configured for the UE by transmitting a bitmap set to "0110100000" as shown in the following table.

TABLE 12

| | Cell ID in a small cell set A | | | | | | | | | |
|---|---|---|---|---|---|---|---|---|---|---|
| | Cell 1 | Cell 2 | Cell 3 | Cell 4 | Cell 5 | Cell 6 | Cell 7 | Cell 8 | Cell 9 | Cell 10 |
| Small cell set B indication field | Bit 0 | Bit 1 | Bit 2 | Bit 3 | Bit 4 | Bit 5 | Bit 6 | Bit 7 | Bit 8 | Bit 9 |
| Value | 0 | 1 | 1 | 0 | 1 | 0 | 0 | 0 | 0 | 0z |

In another example, the small cell set B may be configured for the UE using an activation/deactivation MAC CE. The maximum number of cells which can be included in the small cell set A and the maximum number of cells which can be included in the small cell set B may be set to values pre-designated for the system. When it is assumed that the maximum number of cells or parameter sets included in the small cell set A is 10, an example of the MAC CE for configuring the small cell set B may be given as shown in the following table.

TABLE 13

| $C_{10}$ | $C_9$ | $C_8$ | $C_7$ | $C_6$ | $C_5$ | $C_4$ | $C_3$ | $C_2$ | $C_1$ |
|---|---|---|---|---|---|---|---|---|---|

In Table 13, $C_i$ indicates activation/deactivation of cell i or parameter set i of the small cell set A. A cell or parameter set corresponding to $C_i$ set to 1 may be activated, and a cell or parameter set corresponding to $C_i$ set to 0 may be deactivated.

Referring to FIG. 13, when the small cell set B including cell 2, cell 3 and cell 5 is configured for the UE, a DL signal may be received and/or a UL signal may be transmitted using one of the parameter sets for cell 2, cell 3 and cell 5 among the 10 parameter sets associated with the small cell set A. The eNB operating/controlling the current serving cell of the UE or the eNB operating/controlling the Pcell (or the macro cell) of the UE may select a new serving cell of the UE from among the cells belonging to the small cell set B and inform the UE of the new serving cell through an RRC signal, a MAC CE, or a PDCCH, thereby informing the UE of a parameter set which the UE can actually use among the parameter sets for cell 2, cell 3 and cell 5. That is, one of cell 2, cell 3 and cell 5 may be selected as a new serving cell of the UE. The UE may be notified of the new serving cell by transmitting one of the values matched to the cells of the small cell set B in the manner of one-to-one correspondence to the UE.

TABLE 14

| Value | New serving cell |
|---|---|
| 0 | Cell 2 |
| 1 | Cell 3 |
| 2 | Cell 5 |

For example, in Table 14, if the UE receives 0 as the index of the new serving cell, the UE may recognize cell 2 as the new serving cell thereof, and thus receive a signal and/or transmit a UL signal using a parameter set for cell 2. In terms of PDSCH reception, the UE receives a PDSCH using the parameter set for cell 2.

Alternative 2

The small cell set A and the small cell set B may be represented by sets of parameter sets therefor, rather than by sets of cells thereof. If cell 1 in the small cell set A is used as the serving cell of the UE, an eNB operating/controlling cell 1, an eNB operating/controlling the serving cell that was used before the UE performed handover to cell 1, or an eNB operating/controlling the Pcell (or the macro cell) of the UE may provide the UE with the parameter sets included in the small cell set A through an RRC signal. When content of the respective parameter sets is updated, the eNB operating/controlling cell 1 which is the current serving cell of the UE or the eNB operating/controlling the Pcell (or macro cell) of the UE may transmit, to the UE, the updated parameter set(s) through a higher layer signal. A parameter set may include cell-specific parameters and/or UE-specific parameters for operation of the UE. Examples of the cell-specific parameters and the UE-specific parameters are given below.

Cell-specific parameters
    cell ID(cell ID)
    MIB-related parameters
    SIB1-related parameters
    PRACH configuration
    Cell ON/OFF-related information
    Information on PDSCH mapping for CoMP and information on QCL between DMRS and CSI-RS (e.g., the number of CRS ports, configuration of zero power CSI-RS, PDSCH start symbol, and CSI-RS resource index)

UE-specific parameters
    Information on PDSCH mapping for CoMP and information on QCL between DMRS and CSI-RS (e.g., the number of CRS ports, configuration of zero power CSI-RS, PDSCH start symbol, and CSI-RS resource index)
    SRS transmission-related parameters The small cell set B may be configured with all or some of parameter sets in the small cell set A. If the serving cell of the UE is cell 1 which is a cell belonging to the small cell set A, an eNB operating/controlling cell 1, an eNB operating/controlling the serving cell that was used before the UE performed handover to cell 1, or an eNB operating/controlling the Pcell (or the macro cell) of the UE may inform the UE of the parameter sets belonging to the small cell set B through an RRC signal or an MAC CE. For example, a MAC CE activated by parameter set(s) belonging to the small cell set B among the parameter sets belonging to the small cell set A may be transmitted to the UE, or an RRC signal containing index(s) of parameter set(s) belonging to the small cell set B among the indexes of the parameters belonging to the small cell set A may be transmitted to the UE.

The parameter set(s) included in the small cell set B may be configured as parameter set(s) for the UE through an RRC configuration, a MAC CE, or a PDCCH which are different from those of the conventional handover technique. The small cell set B may include only one parameter set. In this case, the small cell set B may a parameter set which the UE is currently using.

To designate one of the parameter sets in the small cell set B as a new parameter set for the UE to use, an eNB operating/controlling the current serving cell of the UE or an eNB operating/controlling the Pcell (or the macro cell) of the UE may switch the parameter set for the UE to use through a new RRC reconfiguration process. Alternatively, the eNB operating/controlling the current serving cell of the UE or the eNB operating/controlling the Pcell (or the macro cell) of the UE may switch parameter sets for the UE to use by transmitting, to the UE, a MAC CE which is set to activate a new parameter set for the UE to use among the parameter sets in the small cell set B and deactivate parameter set(s) that are not used among the parameter sets. Alternatively, the eNB operating/controlling the current serving cell of the UE or the eNB operating/controlling the Pcell (or the macro cell) of the UE may make a request for switching of a parameter set used by the UE to another parameter set through a PDCCH/ePDCCH. In this case, the PDCCH/ePDCCH may contain information on whether or not the parameter set used by the UE is switched to another parameter set and/or information on the index of a parameter set for the new serving cell. The index of a parameter set to which the parameter set is to be switched may be transmitted to the UE by setting the index in an existing field (e.g., a TPC field) of the DCI or by adding a new field to the DCI and setting the index in the new field. Once the UE receives information such as the index of the new parameter set, the UE may operate, recognizing the new parameter set as a parameter set for the UE to use until the UE receives the next request for switch of the parameter set. In terms of PDSCH reception, if the UE receives information such as the index of the new parameter set, the UE may receive a PDSCH using the indicated new parameter set. For example, if the UE receives the index of a new parameter set through a PDCCH, the UE may receive a PDSCH using the new parameter set from the subframe in which the PDCCH has been detected (until the UE receives the index of the next parameter set associated with switching between the parameter sets). In another example, if the UE receives information such as the index of the parameter set of the UE through every PDCCH, the UE may receive a PDSCH in the subframe in which the PDCCH has been received, using the parameter set indicated by the PDSCH.

Two or more parameter sets in the small cell set B may be designated as parameter sets for the UE to use. For example, a UE may use two designated parameter sets. When the two parameter sets used by one UE are defined as Pset_C and Pset_U, the parameters constituting Pset_C differ from those constituting Pset_U, and the parameter sets does not include the same parameter. For example, Pset_C may be a set of cell-specific parameters, and Pset_U may be a set of UE-specific parameters. When new parameter sets are designated for the UE, only some parameter sets of the two or more parameter sets which the UE is using may be switched to the new parameter sets.

Alternatively, two or more small cell sets A may be configured. For example, suppose that two small cell sets A configured for the UE are small cell set A_C and small cell set A_U. The parameters included in the parameter sets belonging to small cell set A_C may differ from the parameters included in the parameter sets belonging to small cell set A_U, and no identical parameter can be included in a parameter set in small cell set A_C and a parameter set in small cell set_U at the same time. For example, the parameter sets belonging to small cell set A_C may be sets of cell-specific parameters, and the parameter sets belonging to small cell set A_U may be sets of UE-specific parameters. Similar to configuration of the two small cell sets A, there may be two small cell sets B in relation to the small cell sets A. For example, small cell set B_C may be configured with all or some of the parameter sets in small cell set A_C, and small cell set B_U may be configured with all or some of the parameter sets in small cell set A_U. One parameter set may be designated in each of the multiple small cell sets B and the UE may use the designated parameter sets. For example, when small cell set B_C and small cell set B_U are configured, one parameter set may be designated in each of small cell set B_C and small cell set B_U such that the UE uses the designated parameter sets. In this case, the UE may use a cell-specific parameter set provided from small cell set B_C and a UE-specific parameter set from small cell set B_U. As another example, when the UE has two small cell sets A defined as small cell set A_C and small cell set A_U, small cell set A_C may be configured as a set of cells, and small cell set A_U may be configured as a set of parameter sets. In this case, the UE may be provided with parameter sets for the respective cells belonging to small cell set A_C as described above in Alternative 1. In addition, as described in Alternative 2, the UE may be provided with the parameter sets included in small cell set A_U. In this case, each of the parameter sets for the cells belonging to small cell set A_C may include cell-specific parameters for the corresponding cell. In addition, each of the parameter sets belonging to small cell set A_U may be configured as a set of UE-specific parameters. Similar to the small cell sets A, two small cell sets B may be provided in relation to the small cell sets A. Small cell set B_C may be a set of all or some of the cells included in small cell set A_C, and small cell set B_U may be a set of all or some of the parameter sets included in small cell set A_U. In this case, the UE may be informed of a serving cell of the UE designated in small cell set B_C and use a parameter set related to the designated cell. In addition, the UE may use a parameter set designated in small cell set B_U. For example, a serving cell for the UE to use may be designated in small cell set B_C, and the UE may use a cell-specific parameter set related to the designated cell. The UE may also be provided with a UE-specific parameter set for the UE to use from small cell set B_U.

Alternative 3

If cell 1 which is a cell belonging to the small cell set A is used as the serving cell of the UE, an eNB operating/controlling cell 1, an eNB operating/controlling the serving cell that was used before the UE performed handover to cell 1, or an eNB operating/controlling the Pcell (or the macro cell) of the UE may provide the UE with (common) information on all cells included in the small cell set A or common parameter(s) which are needed for the UE to operate in the small cell set A. For example, the following parameter(s) may be included in the common parameter(s).

Bandwidth
MBSFN subframe configuration
UL/DL configuration
Special subframe configuration
Operating frequency The UE may determine that all the cells in small cell set A have the same value for the provided common parameter(s). Alternatively, the UE may determine that the UE can operate using the provided common parameter(s) in the small cell set A.

The small cell set B may be configured with all or some of the cells in the small cell set A. If cell 1 which is a cell belonging to the small cell set A is used as the serving cell of the UE, an eNB operating/controlling cell 1, an eNB operating/controlling the serving cell that was used before the UE performed handover to cell 1, or an eNB operating/controlling the Pcell (or the macro cell) of the UE may signal, to the UE, the cells belonging to the small cell set B through an RRC signal or a MAC CE. Additionally, the eNB operating/controlling cell 1, the eNB operating/controlling the serving cell that was used before the UE performed handover to cell 1, or the eNB operating/controlling the Pcell (or the macro cell) of the UE may inform the UE of the cell-specific parameters for each of the cells belonging to the small cell set B through the RRC signal or the MAC CE.

The cells included in the small cell set B may be used as cells to which the serving cell of the UE can be switched through an RRC configuration, a MAC CE, or a PDCCH which are different from those of the conventional handover technique.

Cell 1 which is the current serving cell of the UE belonging to the small cell set A is included in the small cell set B. the next serving cell for the UE to use is selected from among the cells included in the small cell set B. The serving cell of the UE or a cell configuring the small cell set B may always belong to a new small cell set B. If a new small cell set B is configured for the UE, the current serving cell of the UE should belong to the new small cell set B. In addition, if the new small cell set B of the UE is configured, a cell configuring the new small cell set B should be included in the new small cell set B.

Specifically, the small cell set B may include only one cell. In this case, the small cell set B may be the current serving cell of the UE.

To designate one of the cells in the small cell set B as a new serving cell of the UE, an eNB operating/controlling the current serving cell of the UE or an eNB operating/controlling the Pcell (or the macro cell) of the UE may switch the serving cell of the UE through a new RRC reconfiguration process different from the existing handover process. In this case, the serving cell of the UE may be more quickly switched since the cells included in the small cell set B are in the RRC_Connected state or there is no intervention of the core/MME. Alternatively, the eNB operating/controlling the current serving cell of the UE or the eNB operating/controlling the Pcell (or the macro cell) of the UE may switch the serving cell of the UE by transmitting, to the UE, a MAC CE which is set to activate a new cell and deactivate the other cell(s). Alternatively, the eNB operating/controlling the current serving cell of the UE or the eNB operating/controlling the Pcell (or the macro cell) of the UE may make a request for switching of the serving cell of the UE through a PDCCH/ePDCCH. In this case, information on whether or not the serving cell of the UE is switched to another cell and/or information such as the index of a new serving cell may be included in the PDCCH/ePDCCH. The index of a cell to which the serving cell is to be switched, namely the target cell may be sent to the UE by reusing an existing field (e.g., the TPC field) of the DCI or by adding a new field to the DCI.

Once the UE receives the information such as the index of the new serving cell, the UE may operate, recognizing the corresponding cell as the serving cell thereof, until it receives a next request for switching of the serving cell. The UE may also operate using a cell-specific parameter set for the indicated new serving cell in addition to a set of common parameters. In terms of PDSCH reception, if the UE receives information such as the index of the new serving cell, the UE may receive a PDSCH using the cell-specific parameter set for the indicated new serving cell in addition to the set of common parameters. If the UE receives information such as the index of the new serving cell through a PDCCH, the UE may receive a PDSCH using the cell-specific parameter set for the new serving cell indicated by the PDCCH in addition to the set of common parameters from the subframe in which the UE has received the PDCCH (until the UE receives a PDCCH carrying information on another cell-specific parameter set). Alternatively, if the UE receives information such as the index of the serving cell of the UE through every PDCCH, the UE may receive the PDSCH in the subframe in which the UE has received a PDCCH using the cell-specific parameter set for the new serving cell indicated by the PDCCH in addition to the set of common parameters.

Determination of Switching of the Serving Cell

An eNB operating/controlling the serving cell of the UE or an eNB operating/controlling the Pcell (or the macro cell) of the UE references an RRM value of each cell reported by the UE in order to perform determination related to switching of the serving cell of the UE. The eNB may consider switching the serving cell of the UE based on the measurement values for the other cells in the small cell set B in the following situations.

- The serving cell is worsened below an absolute threshold. Herein, the absolute threshold may be set separately from the threshold in existing handover. Specifically, the absolute threshold may have a value greater than that of the threshold in existing handover.
- The serving cell candidate becomes better than an absolute threshold. Herein, the absolute threshold may be set separately from the threshold in existing handover. Specifically, the absolute threshold may have a value less than that of the threshold in existing handover.
- A serving cell in the serving cell set B becomes better than the offset relative to the serving cell. Herein, the offset may be set separately from the offset in existing handover. Specifically, the offset may have a value less than that of the offset in existing handover.
- The serving cell is worsened below an absolute threshold and a cell in the serving cell set B becomes better than another absolute threshold. Herein, the two absolute thresholds may be set separately from the absolute thresholds in the existing handover.

Operation of UE in Switching Serving Cell

The time taken for a signal transmitted from a UE to reach an eNB may depend on the radius of the cell, the position of the UE in the cell, and the speed of movement of the UE. That is, if the eNB does not manage transmission timing for each UE, a transmitted signal from a specific UE possibly interferes with a transmitted signal from another UE, and the error rate of the received signal on the eNB increases. More specifically, for a UE attempting to transmit a signal at the edge of the cell, the time taken for the transmitted signal to reach the eNB will be longer than the time taken for a signal transmitted from a UE at the center of the cell to reach the eNB. In other words, the time taken for a signal transmitted from a UE at the center of the cell to reach the eNB will be shorter than the time taken for a signal transmitted from the UE at the edge of the cell to reach the eNB. To prevent interference between data or signals transmitted from all UEs in the cell, the transmitted data or signals need to be adjusted to be received within each effective time boundary, and thus the eNB needs to properly adjust transmission timing of the UE according to the condition of the UE. This adjustment is called timing advance management or timing alignment management. One method to manage the UL time alignment may be a random access procedure. The random access procedure (also called an RACH process) is performed for the following Pcell-related events: initial access in the RRC_Idle state, and RRC connection re-establishment process; handover, arrival of DL data during the RRC_Connected state requiring the random access procedure, arrival of UL data during the RRC_Connected state requiring the random access procedure, and positioning during the RRC_Connected state requiring the random access procedure. The random access procedure may be performed on the Scell to establish a time alignment for a timing advance group (TAG) which uses the same timing advance value. The random access procedure is initiated by a PDCCH order or a MAC sublayer. Before the random access procedure can be initiated, 1) information (prach-ConfigIndex) representing an available set of PRACH resources for transmission of a random access preamble and 2) information representing the groups of random access preambles and a set of available random access preambles in each group are assumed.

The random access procedure is divided into a contention-based random access procedure and a non-contention-based random access procedure according to how the UE selects an RACH preamble. In the contention-based random access procedure, the UE randomly selects one RACH preamble from a set of specific RACH preambles and uses the same. In the non-contention-based random access procedure, the UE uses a specific RACH preamble allocated thereto by the eNB. The contention-based random access procedure may be performed according to the following steps.

1) Random Access Preamble

In contention-based random access, the UE may randomly select one random access preamble from a set of random access preambles (also called RACH preambles) indicated through system information or a handover command, and select and transmit a PRACH resource for transmission of the random access preamble.

2) Random Access Response

After the UE transmits the random access preamble, the UE attempts to receive a random access response thereof indicated by the eNB through the system information or handover command within a random access response reception window. More specifically, the random access response information may be transmitted in the form of a MAC PDU (Packet Data Unit), which may be delivered over a PDSCH. To properly receive the information delivered over the PDSCH, the UE may monitor the PDCCH using an RA-RNTI. The RA-RNTI has a value determined based on the PRACH over which the random access preamble is transmitted. The PDCCH may contain information on the UE to receive the PDSCH, and information on frequency and timing of a radio resource of the PDSCH, and the transmission format of the PDSCH. Once the UE succeeds in receiving the PDCCH transmitted thereto, the UE may properly receive a random access response transmitted over the PDSCH according to the information of the PDCCH. The random access response may include a random access preamble identifier (RAPID), a UL grant informing of a UL radio resource, a temporary cell radio network temporary identifier (temporary C-RNTI), and a timing advance value. If the random access response includes a RAPID corresponding to the random access preamble which the UE has selected in Step 1, the UE may acquire a UL grant, a temporary C-RNTI and a timing advance value, considering that it has succeeded in receiving the random access response.

3. Scheduled Transmission

When the UE receives a valid random access response therefor, the UE processes information contained in the random access response. That is, the UE applies the timing advance value and stores the temporary C-RNTI. In addition, the UE transmits, to the eNB, the data stored in the buffer thereof or new data generated using the UL grant. Herein, the data according to the UL grant includes an identifier of the UE. In the contention-based random access procedure, the eNB cannot determine which UE(s) perform the random access procedure. To resolve contention later, the eNB needs to identify the UEs. There are two methods for including the identifier of a UE in the data transmitted to the eNB in response to the UL grant. According to one method, a UE possessing a valid cell identifier allocated in a corresponding cell prior to the random access procedure transmits the cell identifier through a UL transmission signal corresponding to the UL grant. On the other hand, a UE that has not been assigned a valid cell prior to the random access procedure transmits a unique identifier thereof (e.g., SAE (System Architecture Evolution) TMSI (Temporary Mobile Subscriber Identity) or a random ID). In general, the unique identifier is longer than the cell identifier. The UE having transmitted the data corresponding to the UL grant initiates a contention resolution timer (hereinafter, "CR timer").

4. Resolution of Contention

Once the UE has transmitted, to the eNB, data containing the identifier of the UE in response to the UL grant contained in the random access response, the UE waits for an instruction from the eNB. That is, the UE attempts to receive a PDCCH to receive a specific message from the eNB. There are two methods for receiving the PDCCH. If the identifier of the UE transmitted in response to the UL grant is a cell identifier as described above, the UE attempts to receive a PDCCH using the cell identifier thereof. If the identifier of the UE transmitted in response to the UL grant is a unique identifier, the UE may attempt to receive a PDCCH using the temporary C-RNTI contained in the random access response. In the former case, if the UE receives a PDCCH through the cell identifier thereof before the CR timer expires, the UE terminates the random access procedure, determining that the random access procedure has been normally performed. In the latter case, if the UE receives a PDCCH through the temporary C-RNTI before the CR timer expires, the UE checks the data carried on the PDSCH indicated by the PDCCH. If the data carried by the PDSCH contains the unique identifier of the UE, the UE terminates the random access procedure, determining that the random access procedure has been normally performed.

The non-contention-based random access procedure may be performed through the following steps.

1) Allocation of a Random Access Preamble

The non-contention-based random access procedure may be performed when the handover process is performed or the procedure is requested according to a command from the eNB. Of course, the contention-based random access procedure may be performed in both cases. First, the UE is assigned a dedicated random access preamble which will not be subject to contention in order to perform the non-contention-based random access procedure. The random access preamble may be signaled to the UE by the eNB through a handover command or a PDCCH order.

2) Random Access Preamble

The UE transmits the dedicated random access preamble thereof to the eNB.

3) Random Access Response

The UE receives a random access response. The UE receives the random access response from the eNB using the same method as that in the contention-based random access procedure.

In the random access procedure, the eNB receives the random access preamble transmitted from the UE, and calculates the timing advance value for shortening or lengthening the transmission timing of the UE, using the reception information of the random access preamble. Then, the eNB informs the UE of the calculated time synchronization value through a random access response, and the UE in turn updates the transmission timing using the value. As another method for UL time alignment, a sounding reference signal (SRS) may be used. The eNB receives an SRS that the UE periodically or randomly transmits, and calculates the timing advance value of the UE through the received signal, informing the UE of the timing advance value. Thereby, the UE updates the transmission timing thereof. In a macro cell, the timing advance value may vary depending on the position of the UE in the macro cell since the cell radius of the macro cell is large. On the other hand, in a small cell, the UE may have the same timing advance value of 0 since the cell radius of the small cell is small. In this case, a UE performing handover or serving cell switch in the small cell performs UL synchronization for a new serving cell, and thus a process of obtaining the UL timing advance value of the new serving cell may be skipped.

If there is an order to switch the serving cell of the UE, the UE may transmit ACK information for the order to a new serving cell to which the serving cell is to be switched. In this case, the UE may transmit ACK information over a PUSCH of the old serving cell indicated through an RRC signal, a MAC CE, or an (e)PDCCH and/or the new serving cell. Alternatively, the UE may transmit the ACK information over a predefined PUCCH of the old serving cell and/or the new serving cell. Alternatively, when the UE receives an order to switch the serving cell of the UE, it may transmit an SRS to the new serving cell. In this case, the UE may transmit information on transmission timing of the SRS and information on SRS transmission RB(s) through an RRC signal, a MAC CE, or a (e)PDCCH.

An eNB operating/controlling the serving cell of the UE or an eNB operating/controlling the Pcell (or the macro cell) of the UE may inform, through a higher layer signal (e.g., an RRC signal), a MAC CE or a (e)PDCCH, the UE having received the order of serving cell switch of whether the UE should perform switch of the serving cell by transmitting an ACK to the new serving cell or by transmitting an SRS to the new serving cell.

If the serving cell of the UE is switched to a specific cell, the eNB operating/controlling the serving cell of the UE or the eNB operating/controlling the Pcell (or the macro cell) of the UE may provide the UE with information on a non-contention RACH resource for the UE to use. The C-RNTI which the UE has received from the old serving cell may continue to be used even when the serving cell is switched to another cell in the small cell set B. If it is necessary to change the C-RNTI, the new serving cell may designate a new C-RNTI. If an RACK resource separate from the RACH resource designated by the old serving cell has not been allocated for the RACH process, the UE may perform the RACH process using the C-RNTI provided in the old serving cell. If the time at which the UE receives a cell switch command (e.g., a time at which the UE receives a PDCCH order) is subframe n, the UE transmits a non-contention-based RACH preamble in subframe n+k (k≥6 in FDD).

If switching of the serving cell occurs, all HARQ buffers may be flushed and a new HARQ soft buffer partition may be designated. If there are Scells configured for the UE, the Scells may be maintained in the Pcell switching process. A previous Pcell or candidate Pcell may inform the UE of whether to maintain or deactivate the Scells configured for the UE. If deactivation of the Scells is signaled, the UE performs the deactivation process for the Scells.

The eNB operating/controlling the serving cell of the UE or the eNB operating/controlling the Pcell (or the macro cell) of the UE may provide the UE with serving cell switch priority values of the cells belonging to the small cell set B of the UE, or provide the UE with information on a cell assigned a highest priority for serving cell switching. The UE may use such information to determine the serving cell. For example, if the UE determines that the UE has been disconnected from the serving cell as a result of radio link monitoring (RLM), the UE may switch the serving cell to a cell having a serving cell switch priority or having the highest serving cell switch priority. The UE may send an RACH preamble to a cell having the highest priority to switch of the serving cell, and the cell receiving the RACH preamble may be configured as the serving cell of the UE without undergoing the higher layer handover process. In this case, the UE may use a non-contention-based RACH resource allocated to the UE, and the RACH timing to be applied may be RACH timing of a new cell, namely a target cell for the UE to access according to the configured information.

Embodiment B. OFF State Detection

Each of the cells in the small cell set A may be in an ON state or an OFF state. A cell in the OFF state may not be included in the small cell set B of the UE.

Regarding physical channel transmission, if a specific cell is in the OFF state, this may means that the physical channel of the cell is not transmitted. Regarding physical signal transmission, if a specific cell is in the OFF state, this may mean that only the CRS/TRS (tracking RS) and/or synchronization signal (SS) of the cell is transmitted with a periodicity equal to or longer than the current periodicity. Alternatively, if a specific cell is in the OFF state, this may mean that a new signal called a discovery signal is periodically transmitted in the specific cell in place of physical signals defined in the current 3GPP LTE standard.

To correctly perform RRM for the specific cell and to ensure signal transmission/reception operation in the cell, the UE needs to check whether a neighbor cell in/out of the small cell cluster, the cells in the small cell set A of the UE, or the cells in the small cell set B are in the ON state or in the OFF state. The discovery signal may be a signal in a format identical/similar to that of an existing signal (e.g., a PSS/SSS, a CRS, a TRS) or a signal in a new format. Although the discovery signal is a signal for detecting a cell in the OFF state, it may be transmitted even when the cell is in the ON state.

If the discovery signal is transmitted only in cells in the OFF state, the UE may determine whether the cells are in the ON state or in the OFF state through blind detection. The UE may determine that a cell in which the discovery signal is detected is in the OFF state.

Even when the discovery signal is transmitted not only from a cell in the OFF state but also from a cell in the ON state, the UE may determine whether the cells are in the ON state or in the OFF state through blind detection. Particularly, if a discovery signal transmitted in the OFF state and a discovery signal transmitted in the ON state use different sequences or have different transmission periodicities, the UE may determine whether the corresponding cells are in the ON/OFF state through blind detection. If the discovery signal is transmitted in the ON state as well, or if a discovery signal transmitted in the OFF state and a discovery signal transmitted in the ON state have the same periodicity or different periodicities, the OFF state of a cell cannot be quickly detected through blind detection. To quickly detect the OFF state in a situation in which the discovery signal is transmitted in the ON state as well, a cell ID used to generate a discovery signal for a cell in the OFF state may be set differently from a cell ID used to generate a discovery signal for a cell in the ON state. For example, when it is assumed that there are 504 cell IDs in total, cells in the ON state may use one of cell IDs from 0 to 251 to generate a discovery signal, and cells in the OFF state may use one of cell IDs from 252 to 503 to generate a discovery signal. In another example, the cells in the ON state may use even-numbered cell IDs to generate a discovery signal, and the cells in the OFF state may use odd-numbered cell IDs to generate a discovery signal. The cell IDs given when a cell is in the ON state and the OFF state may be defined to have a specific relationship therebetween. For example, a cell having a cell ID of N in the ON state may be specified to use a cell ID of N+252 in the OFF state. In another example, a cell having a cell ID of N in the ON state may be specified to use a cell ID of N+1 in the OFF state. A separate cell ID(s) which a cell can use in the OFF state may be designated or introduced anew.

To allow the UE to readily distinguish a discovery signal from a cell in the ON state from a discovery signal from a cell in the OFF state, a different scrambling sequence may be applied to each discovery signal depending on whether a corresponding cell in the ON/OFF state. A cell may apply a specific scrambling sequence to generate a discovery signal, and the UE may use the scrambling sequence to detect the discovery signal, thereby determining whether the discovery signal is a signal transmitted from a cell in the ON state or a signal transmitted from a cell in the OFF state.

Alternatively, the discovery signal may carry a field, a bit or information for indicating whether a cell is in the ON state or in the OFF state.

The UE may obtain information on the cells belonging to the small cell set A from an eNB operating/controlling the serving cell of the UE or an eNB operating/controlling the Pcell (or the macro cell) of the UE. The UE may recognize whether a specific cell is in the ON state or in the OFF state at a specific time, and obtain information on the transmission time of the discovery signal, a cell ID and the like.

Embodiment C. RRM in a Small Cell Cluster

The UE may periodically/aperiodically report an RRM result and/or RLM result for the serving cell, the cells in the small cell set B, the cells in the small cell set A or a neighbor cell to the eNB operating/controlling the serving cell of the UE or the eNB operating/controlling the Pcell (or the macro cell) of the UE. The eNB operating/controlling the serving cell of the UE or the eNB operating/controlling the macro cell of the UE which is another serving cell of the UE may determine implementation of switching of the serving cell of the UE and a cell to which the serving cell is to be switched, namely the target cell, based on the RRM/RLM result report.

The eNB operating/controlling the serving cell of the UE or the eNB operating/controlling the Pcell (or the macro cell) of the UE may determine switch (or handover) of the serving cell of the UE to cell B which is in the OFF state. In this case, the eNB operating/controlling the serving cell of the UE or the eNB operating/controlling the Pcell (or the macro cell) of the UE may make a request for switch of cell B from the current OFF state to the ON state to an eNB operating/controlling cell B. Once cell B enters the ON state, the eNB operating/controlling the serving cell of the UE or the eNB operating/controlling the Pcell (or the macro cell) of the UE may command the UE to perform switching (handover) of the serving cell to cell B.

Alternatively, the UE may determine to switch the serving cell to a cell in the OFF state. In this case, the UE may transmit a message for requesting switching of cell B to the ON state to the eNB operating/controlling the serving cell of the UE, the eNB operating/controlling the Pcell (or the macro cell) of the UE, or the eNB operating/controlling cell B. If the eNB operating/controlling cell B receives the message from the UE or the eNB of the UE, it may switch cell B from the OFF state to the ON state.

When a cell in the small cell set A, a cell in the small cell set B, or a neighbor cell is in the OFF state, the UE may receive a discovery/identification signal transmitted from the corresponding cell in the OFF state, and then perform RSRP measurement, RSRQ measurement and the like.

Figure 14:
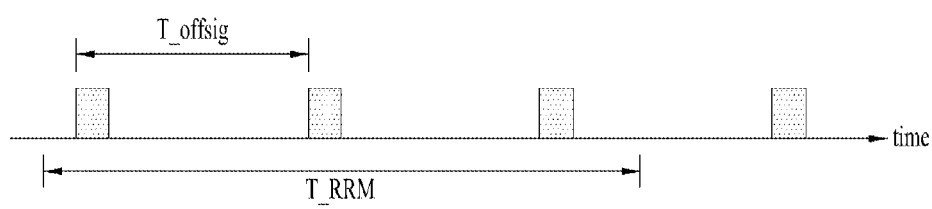
FIG. 14 is a diagram illustrating exemplary transmission of a discovery signal.

FIG. 14 is a diagram illustrating exemplary transmission of a discovery signal.

As shown in FIG. 14, when transmission periodicity of the discovery signal is T_offsig, and a time for which the UE performs RRM in a cell in the small cell set A of the UE, a cell in the small cell set B, or a neighbor cell is T_RRM, T_RRM may be greater than or equal to T_offsig, or may be less than T_offsig. In this case, T_offsig needs to be determined within a time range within which synchronization of the serving cell of the UE can be maintained, in order to maintain connection to the current serving cell while the UE is performing RRM of a cell in the small cell set A of the UE, a cell in the small cell set B, or a neighbor cell. In this case, to allow the UE to correctly perform RRM of the cell in the small cell set A of the UE, the cell in the small cell set B, or the neighbor cell, T_RRM may be set to be greater than or equal to N*T_offsig. Herein, N is greater than 1.

The UE may obtain the discovery signal transmission timing (e.g., T_offsig used in each cell) for the cell in the small cell set A or the cell in the small cell set B from the eNB operating/controlling the serving cell of the UE, the eNB operating/controlling the Pcell (or the macro cell) of the UE, or an eNB operating/controlling each cell and use the same to receive a discovery signal.

The eNB operating/controlling the serving cell of the UE or the eNB operating/controlling the Pcell (or the macro cell) of the UE may inform the UE of information such as the discovery signal transmission timing/periodicity and cell ID of a specific cell when it makes a request for implementation of RRM of a cell in a specific small cell set A, a cell in the small cell set B, or a neighbor cell.

If the UE fails to properly receive a discovery/identification signal of the OFF state in a cell in the small cell set A or small cell set B, and thus cannot determine presence of the cell, the UE may inform the eNB operating/controlling the serving cell of the UE or the eNB operating/controlling the Pcell (or the macro cell) of the UE of this failure. If the cells in the small cell set A or a specific cell in the small cell set B is in the OFF state, and the specific cell transmits no signal in the OFF state, the UE may identify the time at which the specific cell is switched back to the ON state to determine whether the specific cell is switched to the ON state at the right time. If the specific cell is not switched to the ON state at the right time, and thus the UE cannot determine presence of the specific cell, the UE may deliver corresponding information to the eNB operating/controlling the serving cell of the UE or the eNB operating/controlling the Pcell (or the macro cell) of the UE.

When the UE reports the RRM result to the eNB operating/controlling the serving cell of the UE or the eNB operating/controlling the Pcell (or the macro cell) of the UE, the UE may additionally inform the eNB of whether the corresponding RRM report is about a cell in the ON state or a cell in the OFF state. More specifically, if the RRM report is about a cell in the OFF state, the UE may explicitly transmit information indicating the RRM of the cell in the OFF state.

A threshold that is used when the UE reports an RRM result for a cell in the OFF state may be configured or designated through a higher layer signal separately from the threshold which is used when the UE reports an RRM result for a cell in the ON state. In addition, if the cell is not from the small cell set A or the small cell set B, or an RRM request is not received from the serving cell, the UE does not deliver the RRM report for the cell in the OFF state. For example, if cell 4 is not a cell in the small cell set A or the small cell set B, or the UE does not receive a RRM request for cell 4, the UE does not deliver the RRM report of the OFF state for cell 4 even in the case when the UE reads the discovery signal of cell 4 in the OFF state.

When the cell configured for the UE in the small cell set A or the small cell set B is in the ON state, it may be unnecessary for the UE to consistently perform RRM for the cell if the UE is out of the coverage of the cell or the channel state is not good. Alternatively, it may be unnecessary to perform RRM for all the cells in the small cell set A as the small cell set A includes many cells. In this case, the present invention proposes that false information indicating that the cell is in the ON state be delivered to the UE in order to prevent the UE from performing RRM for the unnecessary cell in the small cell set A or a neighbor cell. In this case, the UE may not perform RRM for the cell during a period in which the UE is aware that the cell is in the OFF state. The false OFF state may be UE-specifically configured.

If a cell transmits a discovery signal in the ON state or the discovery signal has the same format as that of a channel/signal transmitted in the ON state, the UE may perform RRM through the discovery signal, assuming that the cell is in the OFF state.

Embodiment D. UE ID for a Macro Cell and a Small Cell

In the conventional systems, only cells used at the same location, namely an aggregation of CCs has been considered. However, CCs of different nodes may also be aggregated. In other words, cells corresponding to different geographical areas may be aggregated.

A UE ID is configured by the eNB in the random access procedure. For example, a C-RNTI may identify a UE in a cell, and may be temporary, semi-persistent or permanent. A temporary C-RNTI may be allocated in a temporary access process, and may become a permanent C-RNTI after contention is resolved. A semi-persistent C-RNTI is used to schedule semi-persistent resources through a PDCCH. The semi-persistent C-RNTI is also called a semi-persistent scheduling (SPS) C-RNTI. A permanent C-RNTI has a C-RNTI value allocated after contention is resolved in the random access procedure, and is used to schedule an operating resource. The present invention proposes that the UE use a UE ID of the UE used in the macro cell and a UE ID of the UE used in the small cell separately when the macro cell and the small cell are used through carrier aggregation.

For example, if the UE ID in the macro cell is separated from the UE ID in the small cell, a specific UE may operate without switching between the UE IDs when the UE using macro cell 1 as the Pcell and small cell 1 as the Scell switches the Pcell to macro cell 2 with small cell 1 maintained as the Scell. In another example, if the UE ID in the macro cell is separated from the UE ID in the small cell, a specific UE may operate without switching the UE ID for the small cell when the UE using macro cell 1 as the Pcell and small cell 1 as the Scell switches the Pcell to small cell 2 in the cluster of small cell 1.

Embodiment A, Embodiment B, Embodiment C and Embodiment D of the present invention may be separately applied or a combination of two or more of the embodiments may be applied.

Figure 15:
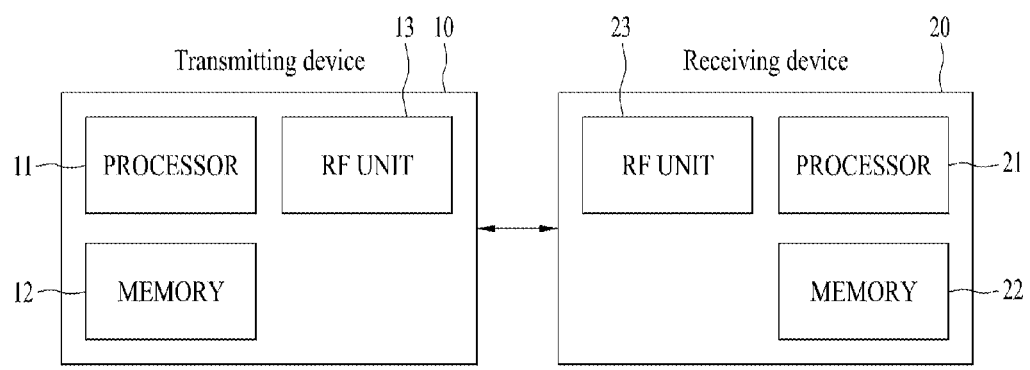
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into Nlayer layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may control the eNB RF unit to transmit small cell set A configuration information on the small cell set A and small cell set A parameter set information on parameter sets corresponding to the small cell set A according to one of Alternative 1, Alternative 2 and Alternative 3 of Embodiment A. The UE RF unit may receive the small cell set A configuration information and the small cell set A parameter set information and deliver the same to the UE processor. The UE processor may store the small cell set A and the corresponding parameter sets in the UE memory. The eNB processor may control the eNB RF unit to transmit, to the UE, small cell set B configuration information indicating a cell or parameter set of the small cell set A which corresponds to the small cell set B. The UE RF unit may receive the small cell set B configuration information, and the eNB may configure a small cell set B based on the small cell set B configuration information. The eNB processor may control the eNB RF unit to transmit indication information indicating a serving cell or parameter set in the small cell set B which the UE actually uses to perform signal transmission/reception. The UE RF unit may receive the indication information. The UE processor may use a parameter set corresponding to the indication information to cause the UE RF unit to receive a DL signal or to decode a DL signal received by the UE RF unit. The UE processor uses a parameter set corresponding to the indication information to generate a UL signal or to cause the UE RF unit to transmit a UL signal.

According to Embodiment B in combination with or separately from Embodiment A, the eNB processor may control the eNB RF unit to transmit a discovery signal through a cell controlled by the eNB processor. The eNB processor may control the eNB RF unit to transmit the discovery signal only in a cell in the OFF state or to transmit the discovery signal in both a cell in the ON state and a cell in the OFF state in a manner that the discovery signal is transmitted with different sequences, different cell IDs, different periodicities and different scrambling sequences according to the ON/OFF states of the cells. The UE RF unit may receive the discovery signals. The UE processor may attempt to decode the discovery signals, thereby detecting the discovery signal transmitted from a cell in the OFF state and/or the discovery signal transmitted from a cell in the ON state.

According to Embodiment C in combination with or separately from Embodiment A and/or Embodiment B, the eNB processor may control the eNB RF unit to transmit a message for requesting RRM reporting. The UE RF unit may receive the message. The UE processor may report an RRM measurement result for a cell for which a request for RRM reporting has been made in response to the message. The eNB processor requesting RRM reporting for a cell in the OFF state may switch the cell to the ON state if the cell is a cell controlled by the eNB, or may make a request for switching of the cell to the ON state to another eNB if the cell is a cell controlled by another eNB. If the UE RF unit receives a request for RRM reporting of the cell in the OFF state, the UE processor may control the UE RF unit to transmit a signal for requesting switching of the cell to the ON state. For a cell in the OFF state, the UE processor may perform RRM measurement using the discovery signal (also called an identification signal) of the cell.

According to Embodiment D in combination with or separately from Embodiment A, Embodiment B and/or Embodiment C, the eNB processor may control the eNB RF unit to transmit/receive signals using different UE IDs for a small cell and a macro cell. The UE processor may control the UE RF unit to transmit/receive signals using different UE IDs for the small cell and the macro cell.

The embodiments of the present invention may be applied not only to the small cells but also to all typical cells. For example, for the typical cells, the small cell cluster, small cell set A and small cell set B applied to the embodiments of the present invention can be replaced with a cell cluster, a cell set A and a cell set B.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to an eNB, a UE, or other devices in a wireless communication system.

What is claimed is:

1. A method for receiving, by a user equipment, a downlink signal, the method comprising:
   receiving, by the user equipment from a serving cell, discovery signal based radio resource measurement information for a cell different from the serving cell;
   receiving, by the user equipment from the cell, a discovery signal of the cell at discovery signal transmission periodicity based on the discovery signal based radio resource measurement information; and
   performing, by the user equipment, reference signal received power, RSRP, measurement for the cell based on the discovery signal,
   wherein the discovery signal based radio resource measurement information includes transmission timing information of the discovery signal,
   wherein the discovery signal transmission periodicity is equal to or shorter than a measurement periodicity at which the RSRP measurement is performed,
   wherein the discovery signal includes a cell specific reference signal of the cell and a synchronization signal of the cell,
   wherein the cell is in on-state during which a physical channel of the cell is received, or in off-state during which only the discovery signal is received from the cell at the discovery signal transmission periodicity, and
   wherein the discovery signal transmission periodicity which is periodicity of the cell specific reference signal and the synchronization signal when the cell is in off-state is longer than respective periodicities of the cell specific reference signal and the synchronization signal when the cell is in on-state.

2. The method according to claim 1,
   wherein, when the cell is in off-state, the RSRP measurement is performed based on the discovery signal of the cell.

3. The method according to claim 1, further comprising:
   receiving, by the user equipment, cell on/off information for the cell.

4. The method according to claim 1,
   wherein the cell is in radio resource control connected with the user equipment.

5. The method according to claim 1, further comprising:
   receiving, by the user equipment, a command to hand over from the serving cell to the cell.

6. A method for transmitting, by a base station, a downlink signal, the method comprising:
   transmitting, to a user equipment through a serving cell of the user equipment, discovery signal based radio resource measurement information for a cell different from the serving cell; and
   receiving, from the user equipment, information on reference signal received power, RSRP, measured based on a discovery signal of the cell by the user equipment,
   wherein the discovery signal based radio resource measurement information includes transmission timing information of the discovery signal transmitted at a discovery signal transmission periodicity,
   wherein the discovery signal transmission periodicity is equal to or shorter than a measurement periodicity at which the RSRP is measured,
   wherein the discovery signal includes a cell specific reference signal of the cell and a synchronization signal of the cell,
   wherein the cell is in on-state during which physical channel of the cell is transmitted, or in off-state during which only the discovery signal is transmitted from the cell at the discovery signal transmission periodicity, and
   wherein the discovery signal transmission periodicity which is periodicity of the cell specific reference signal and the synchronization signal when the cell is in off-state is longer than respective periodicities of the cell specific reference signal and the synchronization signal when the cell is in on-state.

7. The method according to claim 6,
   wherein, when the cell is in off-state, the RSRP is measured based on the discovery signal of the cell by the user equipment.

8. The method according to claim 6, further comprising:
   transmitting, to the user equipment, cell on/off information for the cell.

9. The method according to claim 6,
   wherein the cell is in radio resource control connected with the user equipment.

10. The method according to claim 6, further comprising:
    requesting, to a base station of the cell to make the cell be in on-state; and
    transmitting, to the user equipment, a command to hand over from the serving cell to the cell.

11. A user equipment for receiving a downlink signal, the user equipment comprising:
    a radio frequency (RF) unit, and
    a processor configured to control the RF unit, the processor further configured to:
       control the RF to receive, from a serving cell, discovery signal based radio resource measurement information for a cell different from the serving cell;
       control the RF to receive, from the cell, a discovery signal of the cell at discovery signal transmission periodicity based on the discovery signal based radio resource measurement information; and
       perform reference signal received power, RSRP, measurement for the cell based on the discovery signal,
    wherein the discovery signal based radio resource measurement information includes transmission timing information of the discovery signal,
    wherein the discovery signal transmission periodicity is equal to or shorter than a measurement periodicity at which the RSRP measurement is performed,
    wherein the discovery signal includes a cell specific reference signal of the cell and a synchronization signal of the cell,
    wherein the cell is in on-state during which a physical channel of the cell is received, or in off-state during which only the discovery signal is received from the cell at the discovery signal transmission periodicity, and
    wherein the discovery signal transmission periodicity which is periodicity of the cell specific reference signal and the synchronization signal when the cell is in off-state is longer than respective periodicities of the cell specific reference signal and the synchronization signal when the cell is in on-state.

12. The user equipment according to claim 11, wherein, when the cell is in off-state, the RSRP measurement is performed based on the discovery signal of the cell.

13. The user equipment according to claim 11, wherein the processor is configured to control the RF unit to receive cell on/off information for the cell.

14. The user equipment according to claim 11, wherein the cell is in radio resource control connected with the user equipment.

15. The user equipment according to claim 11, wherein the processor is configured to control the RF unit to receive a command to hand over from the serving cell to the cell.

16. A base station for transmitting a downlink signal, the base station comprising:
    a radio frequency (RF) unit, and
    a processor configured to control the RF unit, the processor further configured to:
        control the RF to transmit, to a user equipment through a serving cell of the user equipment, discovery signal based radio resource measurement information for a cell different from the serving cell; and
        control the RF to receive, from the user equipment, information on reference signal received power, RSRP, measured based on a discovery signal of the cell by the user equipment,
    wherein the discovery signal based radio resource measurement information includes transmission timing information of the discovery signal transmitted at a discovery signal transmission periodicity,
    wherein the discovery signal transmission periodicity is equal to or shorter than a measurement periodicity at which the RSRP is measured,
    wherein the discovery signal includes a cell specific reference signal of the cell and a synchronization signal of the cell,
    wherein the cell is in on-state during which physical channel of the cell is transmitted, or in off-state during which only the discovery signal is transmitted from the cell at the discovery signal transmission periodicity, and
    wherein the discovery signal transmission periodicity which is periodicity of the cell specific reference signal and the synchronization signal when the cell is in off-state is longer than respective periodicities of the cell specific reference signal and the synchronization signal when the cell is in on-state.

17. The base station according to claim 16, wherein, when the cell is in off-state, the RSRP is measured based on the discovery signal of the cell by the user equipment.

18. The base station according to claim 16, wherein the processor is configured to control the RF unit to transmit, to the user equipment, cell on/off information for the cell.

19. The base station according to claim 16, wherein the cell is in radio resource control connected with the user equipment.

20. The base station according to claim 16, further comprising:
    wherein the processor is configured to request, to a base station of the cell to make the cell be in on-state; and
    wherein the processor is configured to control the RF unit to transmit, to the user equipment, a command to hand over from the serving cell to the cell.

* * * * *